(12) United States Patent
Ihori et al.

(10) Patent No.: US 7,594,021 B2
(45) Date of Patent: Sep. 22, 2009

(54) RADIO COMMUNICATION SYSTEM, RADIO COMMUNICATION APPARATUS AND METHOD, AND PROGRAM

(75) Inventors: Shoko Ihori, Tokyo (JP); Ko Togashi, Tokyo (JP); Shinichi Hirata, Kanagawa (JP)

(73) Assignee: Sony Corporation, Tokyo (JP)

( * ) Notice: Subject to any disclaimer, the term of this patent is extended or adjusted under 35 U.S.C. 154(b) by 953 days.

(21) Appl. No.: 10/816,843

(22) Filed: Apr. 5, 2004

(65) Prior Publication Data
US 2004/0259552 A1 Dec. 23, 2004

(30) Foreign Application Priority Data
Apr. 11, 2003 (JP) ............................. 2003-108277

(51) Int. Cl.
*G06F 15/16* (2006.01)
*G06F 12/00* (2006.01)
(52) U.S. Cl. ...................................... 709/228; 709/250
(58) Field of Classification Search ......... 709/227–229, 709/217, 218, 203, 250; 380/270
See application file for complete search history.

(56) References Cited

U.S. PATENT DOCUMENTS

| | | | |
|---|---|---|---|
| 5,835,860 A | 11/1998 | Diachina | |
| 5,875,394 A | 2/1999 | Daly et al. | |
| 5,940,772 A * | 8/1999 | Kameda | .................... 455/557 |
| 6,301,643 B1 | 10/2001 | Crockett et al. | |
| 6,377,792 B1 | 4/2002 | Brown et al. | |
| 6,535,855 B1 | 3/2003 | Cahill et al. | |
| 6,600,902 B1 | 7/2003 | Bell | |
| 6,834,111 B1 | 12/2004 | Nishimura et al. | |
| 6,856,789 B2 | 2/2005 | Pattabiraman et al. | |

(Continued)

FOREIGN PATENT DOCUMENTS

EP     0 311 112 A2     4/1989

(Continued)

OTHER PUBLICATIONS

Mannual of Magnia, Software Access point Ver. 2.0, B1 edition, Toshiba e-Solution Co., Ltd., Apr. 26, 2002, B1 edition, pp. 49-50.

(Continued)

*Primary Examiner*—Zarni Maung
(74) *Attorney, Agent, or Firm*—Oblon, Spivak, McClelland, Maier & Neustadt, L.L.P.

(57) ABSTRACT

A radio communication system and apparatus is disclosed wherein setting necessary for communication with a desired radio communication apparatus with which a user wants to communicate can be performed with certainty by an operation system familiar to the user and a high security level can be assured for the communication which uses the setting. When a first radio communication apparatus receives a request for communication information necessary for communication through a radio network from a second radio communication apparatus through a radio circuit, it transmits identification information for the radio network and information regarding the security set in advance as communication information therein to the second radio communication apparatus through the radio circuit. The second radio communication apparatus sets the communication information to itself. The invention can be applied to a radio LAN for which a household electric appliance is used.

8 Claims, 15 Drawing Sheets

U.S. PATENT DOCUMENTS

| | | | |
|---|---|---|---|
| 7,103,018 B1* | 9/2006 | Hansen et al. | 370/328 |
| 7,120,129 B2 | 10/2006 | Ayyagari et al. | |
| 7,188,244 B2 | 3/2007 | Matsuno | |
| 7,313,384 B1* | 12/2007 | Meenan et al. | 455/410 |
| 2002/0037699 A1 | 3/2002 | Kobayashi et al. | |
| 2002/0111138 A1 | 8/2002 | Park | |
| 2003/0079143 A1* | 4/2003 | Mikel et al. | 713/200 |
| 2003/0092395 A1* | 5/2003 | Gassho et al. | 455/68 |
| 2003/0162556 A1 | 8/2003 | Libes | |
| 2003/0224797 A1* | 12/2003 | Kuan et al. | 455/446 |
| 2004/0076300 A1 | 4/2004 | Ishidoshiro | |
| 2005/0020207 A1 | 1/2005 | Hamada et al. | |

FOREIGN PATENT DOCUMENTS

| | | |
|---|---|---|
| JP | 10-136088 | 5/1998 |
| JP | 11-177622 | 7/1999 |
| JP | 2001-145163 | 5/2001 |
| JP | 2002-101104 | 4/2002 |
| JP | 2002-330142 | 11/2002 |
| JP | 2002-344458 | 11/2002 |
| JP | 2002-341766 | 12/2002 |
| JP | 2003-101546 | 4/2003 |
| JP | 2003-101553 | 4/2003 |
| JP | 2003-338821 | 11/2003 |
| JP | 3862073 | 12/2006 |

OTHER PUBLICATIONS

Hiroya Kakazu, "Nikkei Open System", The Basics of Security for New Managers (application edition) last part, Danger and the Countermeasure of Wireless LAN, Nikkei Open Systems No. 119, Feb. 26, 2003, p. 189.

Hirotaka Tsuboyama, "DOS/Vmagazine", Softbank Publishing Co., Ltd., vol. 12, No. 4, Feb. 15, 2003, p. 144.

* cited by examiner

F I G. 2
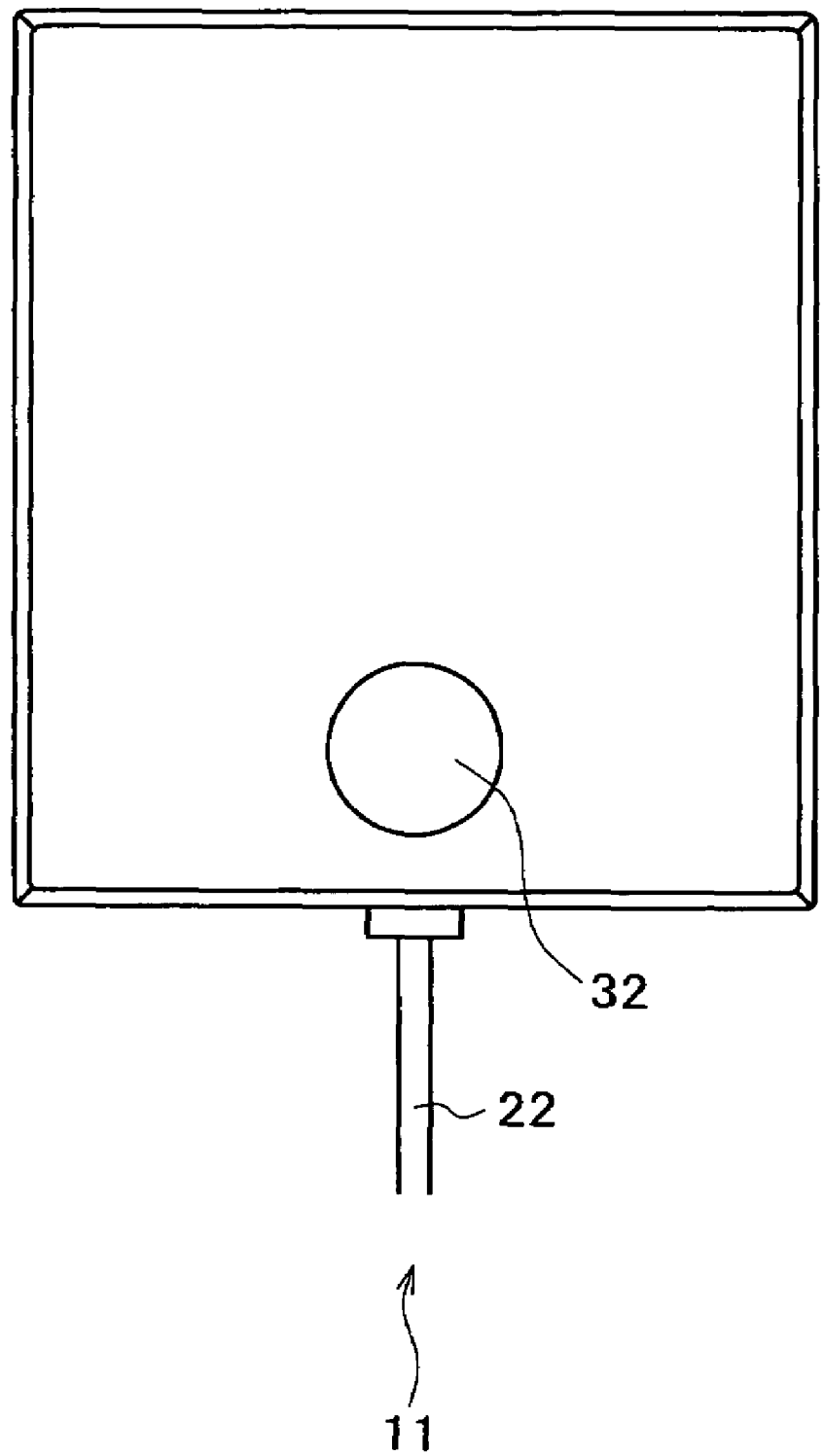

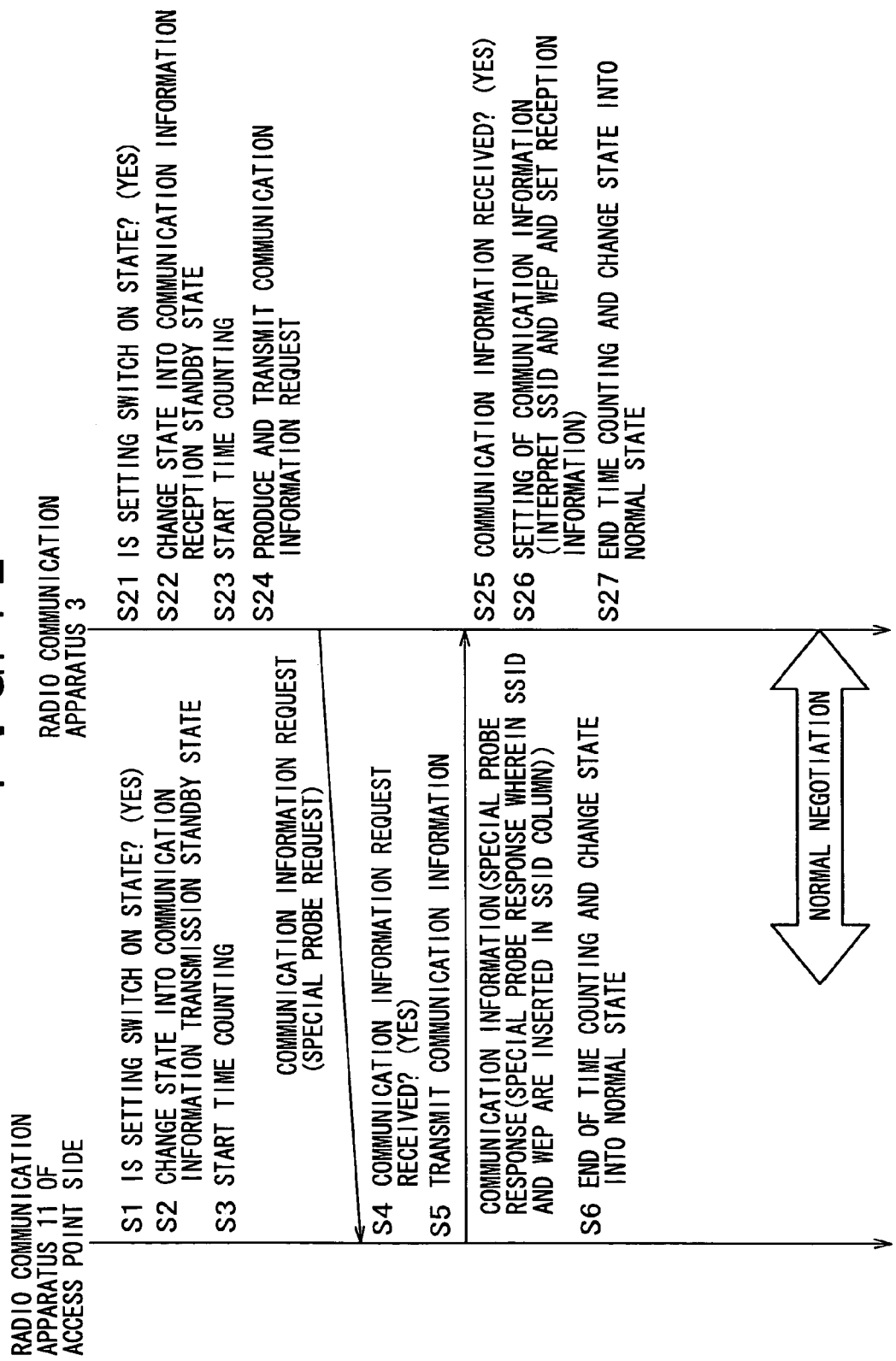

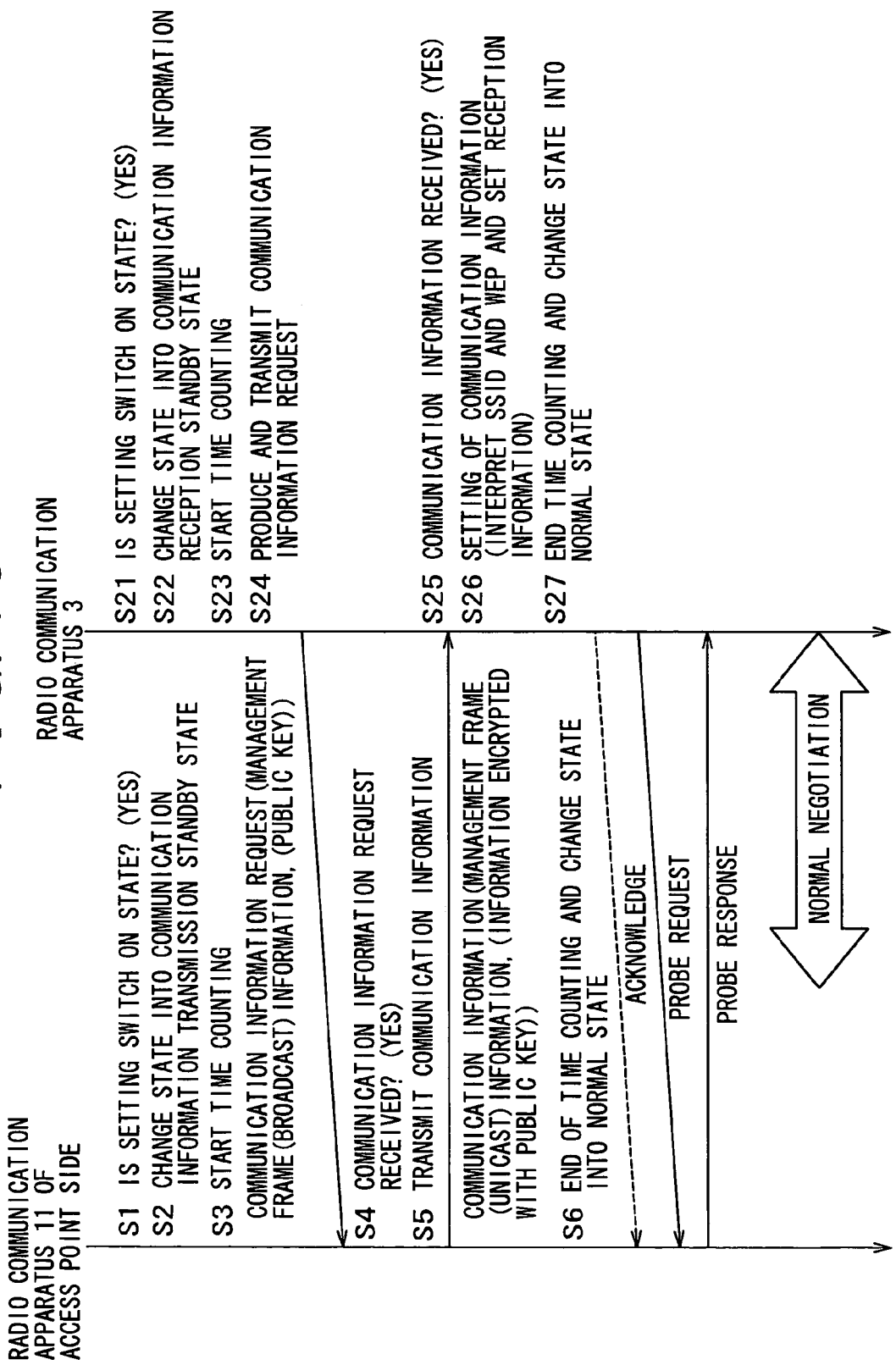

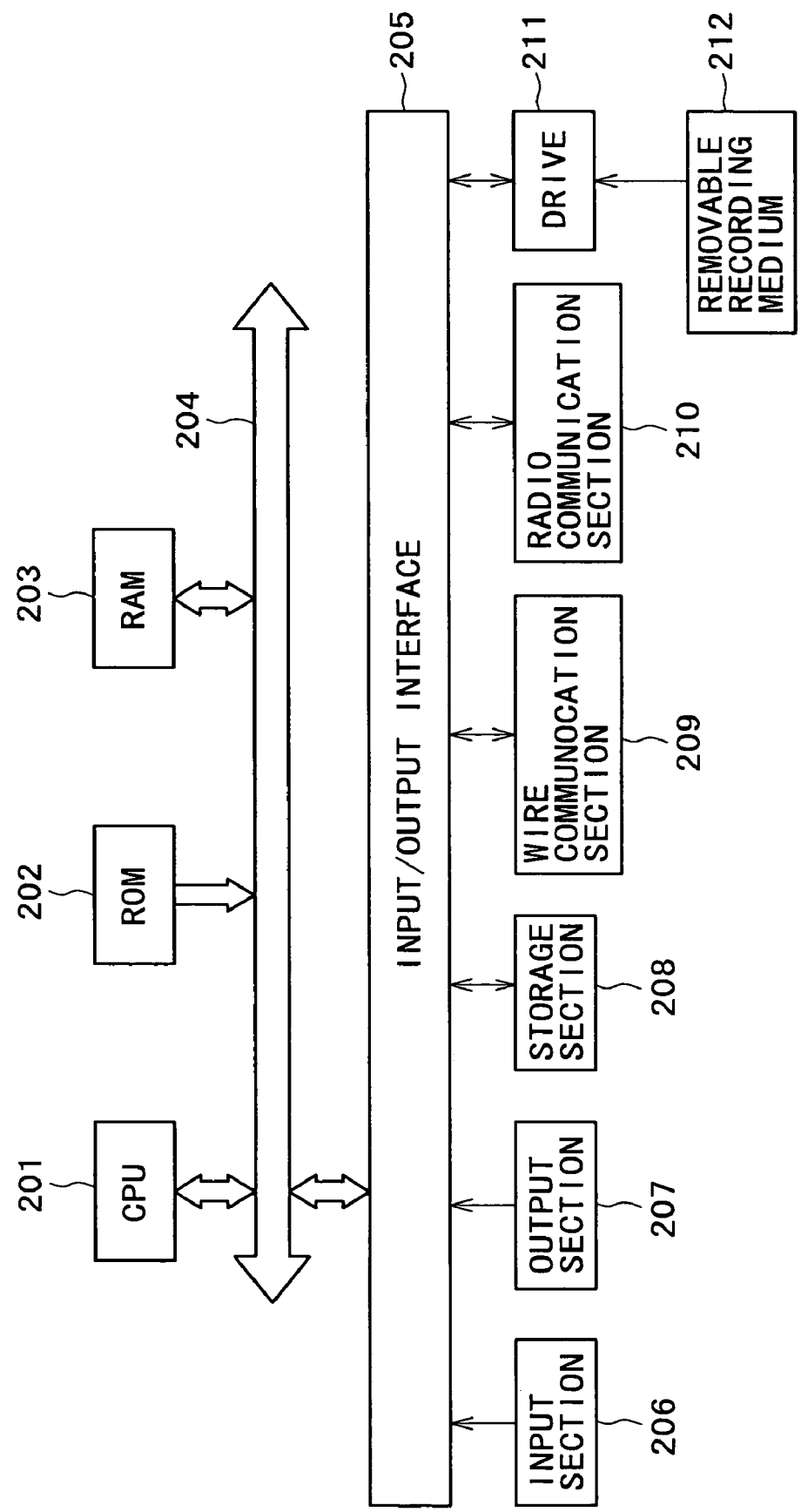

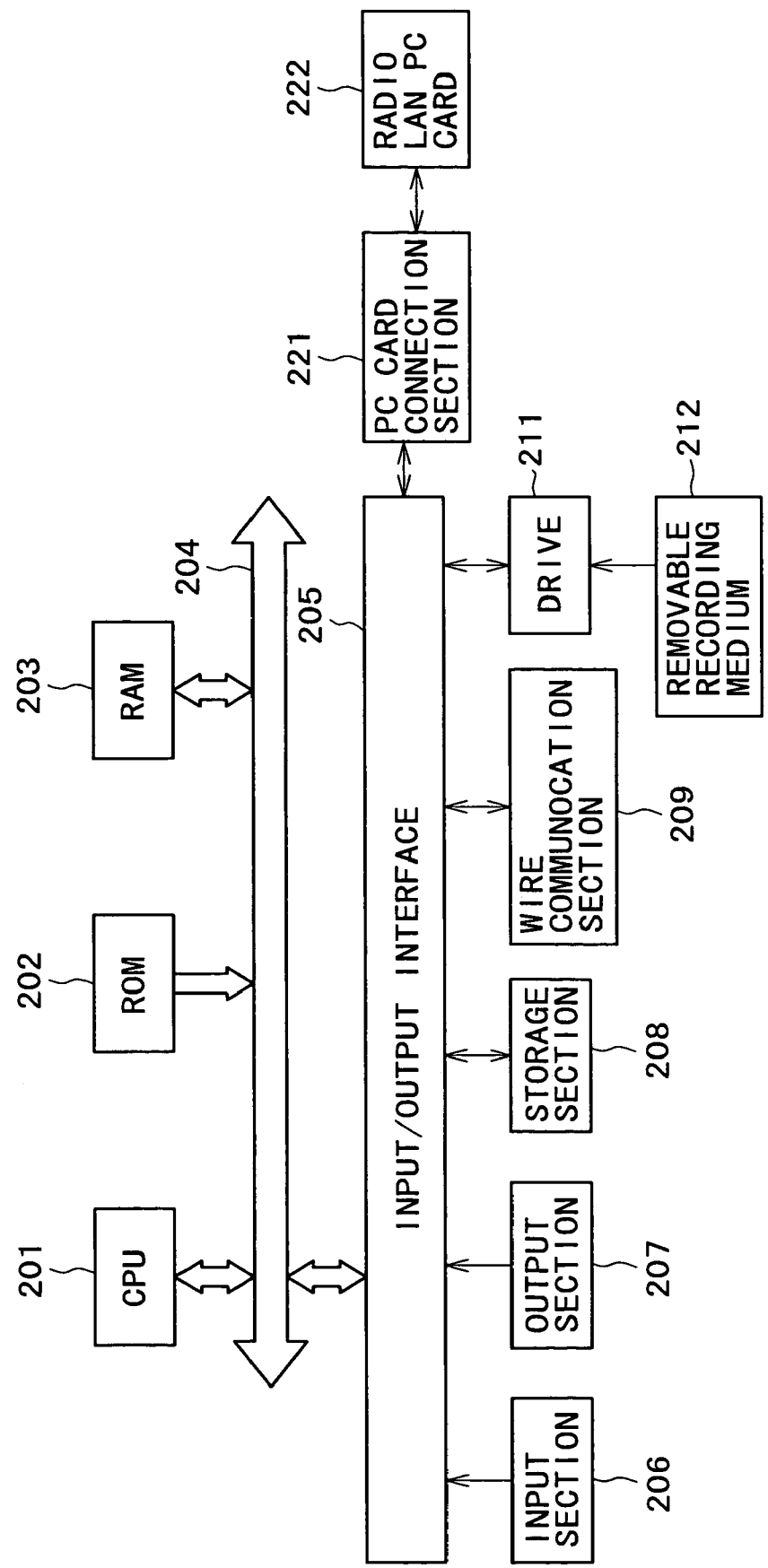

RADIO COMMUNICATION SYSTEM, RADIO COMMUNICATION APPARATUS AND METHOD, AND PROGRAM

BACKGROUND OF THE INVENTION

This invention relates to a radio communication system, a radio communication apparatus and method and a program.

In recent years, a radio LAN (Local Area Network) which utilizes the radio communication standards of the IEEE (The Institute of Electrical and Electronic Engineers, Inc.) 802.11a, 802.11b or 802.11g has been popularized. An example of a radio LAN of the type mentioned is disclosed, for example, in Japanese Patent Laid-Open No. 2002-330142 (hereinafter referred to as Patent Document 1) or Japanese Patent Laid-Open No. 2002-344458 (hereinafter referred to as Patent Document 2).

Conventionally, however, in order to construct such a radio LAN as described above, it is necessary for a user to set unique information such as identification information of the radio LAN such as, for example, an SSID (Service Set Identification) or information regarding the security such as, for example, a WEP (Wired Equivalent Privacy) key using software for exclusive use installed suitably in a personal computer (hereinafter referred to suitably as PC (Personal Computer)).

It is to be noted that, although the software for exclusive use sometimes is a setting tool itself, since such setting is generally performed through setting of a W.W.W. (World Wide Web) page provided in the inside of an access point, in such an instance, a W.W.W. browser corresponds to the software for exclusive use. Or, also a W.W.W. browser may be regarded as one of setting tools.

Thus, there is a first subject in that, in order to construct a ratio LAN, it is necessary for a user to perform complicated operations including a plurality of manual operations such as, for example, manual inputting of an SSID and long operating time is required for the operations.

Further, most setting tools are application software for a PC. Therefore, there is a second subject that a user that does not have a PC cannot construct a radio LAN. In recent years, not only a PC but also a household electric appliance such as a hard disk recorder is available as a terminal of a radio LAN, and the second subject described is remarkable particularly to a user who desires to construct a radio LAN using a household electric appliance without using a PC.

In order to solve the first and second subjects described above, a method has been proposed wherein a station such as, for example, a PC card or a converter for a radio LAN to which information of an access point such as, for example, an SSID is set in advance is sold in a set together with an access point. The method, however, does not solve the first and second subjects sufficiently because the first and second subjects take place where the setting of the access point is changed or another station is purchased newly.

Further, for example, the Patent Document 1 discloses a method wherein a station such as, for example, a radio communication terminal possessed by a user performs connection for communication in an infrastructure mode through an access point set in advance and changes over the mode thereof to an ad-hoc mode if the connection results in failure. It is to be noted here that the infrastructure mode is a mode wherein a connection to an existing network is established through an access point which is a repeater in the network. In contrast, the ad-hoc mode is a mode wherein a radio network is constructed only from radio communication terminals without the intervention of any access point.

The method disclosed in the Patent Document 1, however, presupposes that such identification information (an SSID or the like) of a radio LAN corresponding to a predetermined access point and information (a WEP key) regarding the security as described above and so forth are registered in advance also in the station side. Therefore, it is impossible to perform new setting to another access point or change the setting of an access point set in advance. In other words, the method disclosed in the Patent Document 1 cannot solve the first and second subjects.

Meanwhile, for example, the Patent Document 2 discloses another method wherein radio networks which can be used for radio communication are detected, that is, SSIDs are acquired, and a connection is established to the radio network corresponding to a predetermined one of the acquired SSIDs.

While the Patent Document 2 discloses setting of an SSID as described above, it does not disclose setting of information regarding the security, that is, setting of a WEP key. In other words, while the method disclosed in the Patent Document 2 allows construction of a radio LAN, that is, allows radio communication, it does not involve setting of information regarding the security. Therefore, the method of the Patent Document 2 gives rise to a new third subject that the security in radio communication cannot be assured in a radio LAN in which information regarding the security is not set.

SUMMARY OF THE INVENTION

It is an object of the present invention to provide a radio communication system, a radio communication apparatus and method and a program wherein setting necessary for communication with a desired radio communication apparatus with which a user desires to communicate can be performed with certainty by an operation system familiar to the user and a high security level can be assured for the communication which uses the setting.

In order to attain the object described above, according to an aspect of the present invention, there is provided a radio communication system, including a first radio communication apparatus in which first information for identification of a radio network and second information regarding the security are set in advance as communication information necessary for communication through the radio network, and a second radio communication apparatus operable for communicating with the first radio communication apparatus by radio communication through the radio network, the second radio communication apparatus transmitting request information for requesting for transmission of the communication information to the first radio communication apparatus by radio communication, the first radio communication apparatus transmitting the first and second information as a response to the request information transmitted thereto from the second radio communication apparatus, the second radio communication apparatus setting the first and second information transmitted thereto from the first radio communication apparatus as the communication information, the first and second radio communication apparatuses utilizing the communication information individually set therein to communicate with each other by radio communication.

According to another aspect of the present invention, there is provided a radio communication method for a radio communication system which includes a first radio communication apparatus in which first information for identification of a radio network and second information regarding the security are set in advance as communication information necessary for communication through the radio network and a second radio communication apparatus operable for communicating with the first radio communication apparatus by radio communication through the radio network, including a step performed by the second radio communication apparatus of transmitting request information for requesting for transmission of the communication information to the first radio communication apparatus by radio communication, another step performed by the first radio communication apparatus of transmitting the first and second information as a response to the request information transmitted thereto from the second radio communication apparatus, a further step performed by the second radio communication apparatus of setting the first and second information transmitted thereto from the first radio communication apparatus as the communication information, and a still further step performed by the first and second radio communication apparatuses of utilizing the communication information individually set therein to communicate with each other by radio communication.

In the radio communication system and method, in a first radio communication apparatus, first information for identification of a radio network and second information regarding the security are set in advance as communication information necessary for communication through a radio network. If request information for requesting for transmission of the communication information is transmitted from a second radio communication apparatus to the first radio communication apparatus by radio communication, then the first and second information is transmitted from the first radio communication apparatus as a response to the request information transmitted thereto from the second radio communication apparatus. Then, the first and second information transmitted from the first radio communication apparatus is set as the communication information in the second radio communication apparatus. Thereafter, the first and second radio communication apparatuses utilizes the communication information individually set therein to communicate with each other by radio communication.

The first radio communication system may be any system only if at least two radio communication apparatuses therein communicate with each other through a network. In other words, in the present specification, also where two radio communication apparatuses communicate directly with each other by radio communication, it is interpreted that a radio network is constructed between the two radio communication apparatuses. In particular, in the present specification, the term "radio network" is used for any radio communication network which includes at least two radio communication apparatuses.

Accordingly, each of the radio communication apparatus which construct the radio communication system may be any of, for example, a radio communication apparatus which can communicate with a different radio communication apparatus by radio communication, another radio communication apparatus which can communicate with a different radio communication apparatus by radio communication or by both of radio communication and wire communication, and a further radio communication apparatus which can communicate with a first different radio communication apparatus by wire communication and can communicate with a second different radio communication apparatus by radio communication. In other words, the radio communication system may involve radio communication used in a certain interval and wire information used in another certain interval.

According to a further aspect of the present invention, there is provided a first radio communication apparatus which communicates with a different radio communication apparatus by radio communication through a radio network, including setting means in which first information for identification of the radio network and second information regarding the security are set as communication information necessary for communication through the radio network, and transmission control means for controlling, when request information for requesting for transmission of the communication information is received from the different radio communication apparatus by radio communication, transmission of the first and second information to the different radio communication apparatus as a response to the request information by radio communication.

According to a still further aspect of the present invention, there is provided a radio communication method for a first radio communication apparatus which communicates with a different radio communication apparatus by radio communication through a radio network, including a transmission control step of controlling, when request information for requesting for transmission of communication information necessary for communication through the radio network is transmitted from the different radio communication apparatus to the radio communication apparatus by radio communication, transmission of first information for identification of the radio network and second information regarding the security set as communication information in the radio communication apparatus in advance by radio communication from the radio communication apparatus to the different radio communication apparatus as a response to the request information.

According to a yet further aspect of the present invention, there is provided a first program for causing a computer, which controls a radio communication apparatus which communicates with a different radio communication apparatus by radio communication through a radio network, to execute a transmission control step of controlling, when request information for requesting for transmission of communication information necessary for communication through the radio network is transmitted from the different radio communication apparatus to the radio communication apparatus by radio communication, transmission of first information for identification of the radio network and second information regarding the security set as communication information in the radio communication apparatus in advance by radio communication from the radio communication apparatus to the different radio communication apparatus as a response to the request information.

In the first radio communication apparatus and method and the program, when request information for requesting for transmission of communication information necessary for communication through a radio network is transmitted from a different radio communication apparatus to the first radio communication apparatus by radio communication, first information for identification of the radio network and second information regarding the security set as communication information in the first radio communication apparatus in advance are transmitted by radio communication from the first radio communication apparatus to the different radio communication apparatus as a response to the request information.

The first radio communication apparatus may be any of, for example, a radio communication apparatus which can communicate with a different radio communication apparatus by radio communication, another radio communication apparatus which can communicate with a different radio communication apparatus by wire communication or by both of radio communication and wire communication, and a further radio communication apparatus which can communicate with a first different radio communication apparatus by wire communication and can communicate with a second different radio communication apparatus different from the first different radio communication apparatus by radio communication. In other words, the first radio communication apparatus may involve radio communication used in a certain interval and wire information used in another certain interval.

According to an additional aspect of the present invention, there is provided a second radio communication apparatus which communicates with a different radio communication apparatus by radio communication through a radio network, including transmission control means for controlling transmission of request information for requesting for transmission of communication information necessary for communication through the radio network to the different radio communication apparatus by radio communication, and setting means for setting, when first information for identification of the radio network and second information regarding the security are transmitted as the communication information from the different radio communication apparatus to the radio communication apparatus by radio communication in response to the request information transmitted from the radio communication apparatus under the control of the transmission control means, the first and second information as the communication information therein.

According to another additional aspect of the present invention, there is provided a radio communication method for a second radio communication apparatus which communicates with a different radio communication apparatus by radio communication through a radio network, including a transmission control step of controlling transmission of request information for requesting for transmission of communication information necessary for communication through the radio network to the different radio communication apparatus by radio communication, and a setting step of setting, when first information for identification of the radio network and second information regarding the security are transmitted as the communication information from the different radio communication apparatus to the radio communication apparatus by radio communication in response to the request information transmitted from the radio communication apparatus under the control of the process at the transmission control step, the first and second information as the communication information therein.

According to a further additional aspect of the present invention, there is provided a second program for causing a computer, which controls a radio communication apparatus which communicates with a different radio communication apparatus by radio communication through a radio network, to execute a transmission control step of controlling transmission of request information for requesting for transmission of communication information necessary for communication through the radio network to the different radio communication apparatus by radio communication, and a setting step of setting, when first information for identification of the radio network and second information regarding the security are transmitted as the communication information from the different radio communication apparatus to the radio communication apparatus by radio communication in response to the request information transmitted from the radio communication apparatus under the control of the process at the transmission control step, the first and second information as the communication information therein.

In the second radio communication apparatus and method and the program, after request information for requesting for transmission of communication information necessary for communication through a radio network from the second radio communication apparatus to the different radio communication apparatus by radio communication, when first information for identification of the radio network and second information regarding the security are transmitted as the communication information from the different radio communication apparatus to the second radio communication apparatus by radio communication in response to the request information, the first and second information are set as the communication information in the second radio communication apparatus.

It is to be noted that naturally the present invention can be applied also to a recording medium on or in which any of the programs according to the present invention is recorded.

In summary, according to the present invention, a radio communication apparatus can first perform setting for radio communication with a particular opposite party for communication and then communicate with the opposite party for communication based on the setting.

Particularly, setting necessary for communication with a different radio communication apparatus with which the user of the radio communication apparatus wants to communicate can be performed with certainty making use of an operation system familiar to the user, and also the security level in communication in which the setting is used can be raised.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a front elevational view showing an example of an appearance of a radio communication apparatus of an access point shown in FIG. 1;

FIG. 12 is an arrow chart illustrating a relationship between examples of setting processes for radio communication of the radio communication apparatus of the access point shown in FIG. 1 and the radio communication apparatus connected to the information processing apparatus shown in FIG. 1;

FIG. 13 is an arrow chart illustrating a relationship between different examples of the setting processes for radio communication of the radio communication apparatus of the access point shown in FIG. 1 and the radio communication apparatus connected to the information processing apparatus shown in FIG. 1; and FIGS. 14 and 15 are block diagrams showing different examples of a setting of the radio communication apparatus which composes a radio communication system to which the present invention is applied.

DESCRIPTION OF THE PREFERRED EMBODIMENT

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

Further, the following description does not signify that the prevent invention corresponding to particular elements described in the embodiment of the present invention is all described in the claims. In other words, the following description does not deny the presence of an invention which corresponds to a particular element described in the description of the embodiment of the present invention but is not recited in the claims, that is, the description does not deny the presence of an invention which may be filed for patent in a divisional patent application or may be additionally included into the present patent application as a result of later amendment to the claims.

Figure 1:
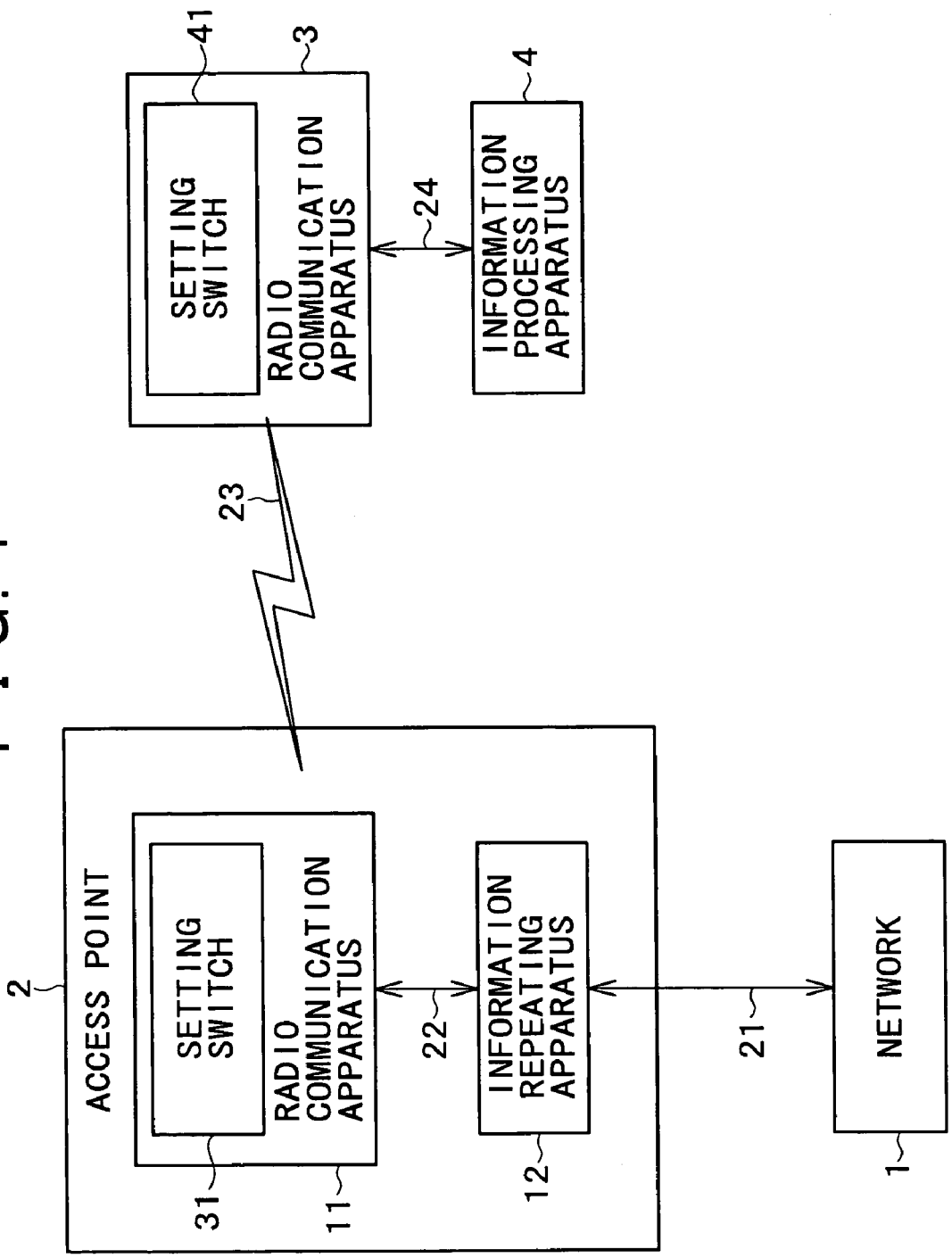
FIG. 1 is a block diagram showing an example of a construction of a radio communication system to which the present invention is applied.

The radio communication system (for example, a radio communication system of FIG. 1) according to claim 1 includes a first radio communication apparatus (for example, an access point 2 (radio communication apparatus 11) of FIG. 1) in which first information for identification of a radio network (for example, a radio network which uses a radio circuit 23 of FIG. 1) and second information regarding the security are set in advance as communication information necessary for communication through the radio network, and a second radio communication apparatus (for example, a radio communication apparatus 3 of FIG. 1) operable for communicating with the first radio communication apparatus by radio communication through the radio network. The second radio communication apparatus transmits request information for requesting for transmission of the communication information to the first radio communication apparatus by radio communication (for example, executes a process at step S24 of FIGS. 12 and 13). Then, the first radio communication apparatus transmits the first and second information as a response to the request information transmitted thereto from the second radio communication apparatus (for example, executes a process at step S5 of FIGS. 12 and 13). Then, the second radio communication apparatus sets the first and second information transmitted thereto from the first radio communication apparatus as the communication information (for example, executes a process at step S26 of FIG. 12). Thereafter, the first and second radio communication apparatuses utilize the communication information individually set therein to communicate with each other by radio communication.

The radio communication apparatus according to claim 3 (for example, a radio communication apparatus 11 of an access point 2 of FIG. 1 (or, for example, the access point 2 including the radio communication apparatus 11) communicates with a different radio communication apparatus (for example, a radio communication apparatus 3 of FIG. 1) by radio communication through a radio network (for example, a radio network which uses a radio circuit 23 of FIG. 1), and includes setting means in which first information for identification of the radio network and second information regarding the security are set as communication information necessary for communication through the radio network, and transmission control means (for example, a main control section 51 of FIG. 4 which executes a communication information transmission module 124 of FIG. 9) for controlling, when request information for requesting for transmission of the communication information is received from the different radio communication apparatus by radio communication, transmission of the first and second information to the different radio communication apparatus as a response to the request information by radio communication.

The radio communication apparatus according to claim 8 further includes encryption means (for example, a main control section 51 of FIG. 5 which executes an encryption module 125 of FIG. 9) for encrypting the communication information at least once, the transmission control means controlling the transmission of the communication information encrypted by the encryption means.

The radio communication apparatus according to claim 11 (for example, a radio communication apparatus 3 of FIG. 1) communicates with a different radio communication apparatus (for example, a radio communication apparatus 11 of an access point 2 of FIG. 1 (or the access point 2 including the radio communication apparatus 11)) by radio communication through a radio network (for example, a radio network which uses a radio circuit 23 of FIG. 1), and includes transmission control means (for example, a main control section 91 of FIG. 8 which executes a communication information request transmission module 132 of FIG. 9) for controlling transmission of request information for requesting for transmission of communication information necessary for communication through the radio network to the different radio communication apparatus by radio communication, and setting means (for example, the main control section 91 of FIG. 8 which executes a communication information setting module 134 of FIG. 9) for setting, when first information for identification of the radio network and second information regarding the security are transmitted as the communication information from the different radio communication apparatus to the radio communication apparatus by radio communication in response to the request information transmitted from the radio communication apparatus under the control of the transmission control means, the first and second information as the communication information therein.

Figure 8:
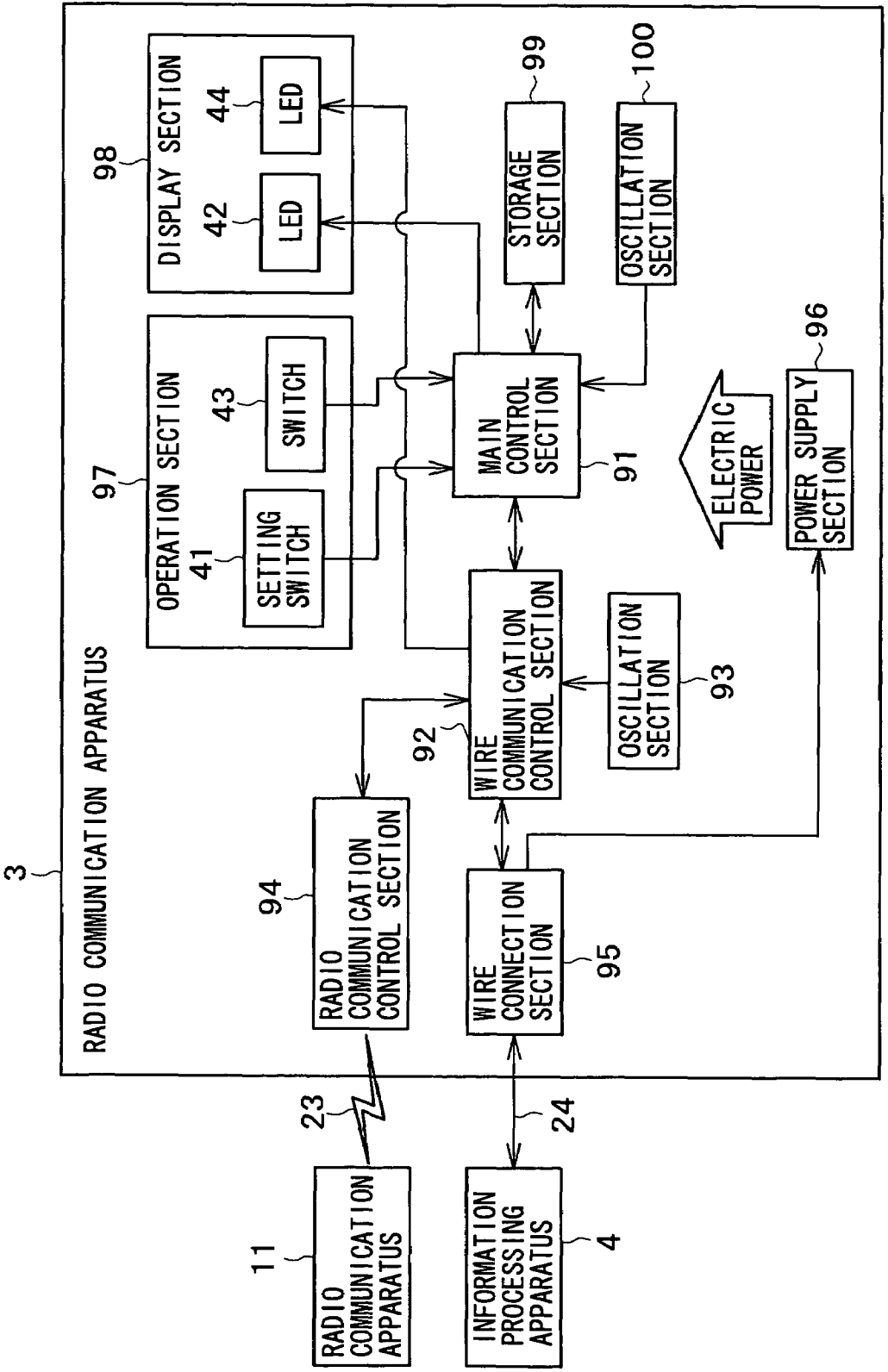
FIG. 8 is a block diagram showing an example of a construction of the radio communication apparatus connected to an information processing apparatus shown in FIG. 1.

The radio communication apparatus according to claim 16 further includes conversion means (for example, a wire communication control section 92 and a radio communication control section 94 of FIG. 8) for converting a signal transmitted thereto through the radio network into a signal which can be transmitted through a wire circuit (for example, a wire circuit 24 which connects to an information processing apparatus 4) and converting a signal transmitted thereto through the wire circuit into a signal which can be transmitted in the radio network.

The radio communication apparatus according to claim 17 can be constructed as a personal computer card (for example, a radio LAN PC card 222 of FIG. 15) for a radio local area network.

The radio communication apparatus according to claim 18 further includes decryption means (for example, a main control section 91 of FIG. 8 which executes a decryption module 135 of FIG. 9) for decrypting, where the first and second information transmitted thereto from the different radio communication apparatus are in a form encrypted at least once, the encrypted first and second information, the setting means sets the first and second information decrypted by the decryption means as the communication information.

Referring to FIG. 1, there is shown an example of a construction of a radio communication system to which the present invention is applied.

In the radio communication system to which the present invention is applied, an access point 2 connected to an external network 1 by a wire circuit 21 and a radio communication apparatus 3 connected to an external information processing apparatus 4 by another wire circuit 24 perform radio communication through a radio circuit 23 therebetween. In other words, the radio communication system to which the present invention is applied includes the access point 2 and the radio communication apparatus 3 and can be applied, for example, where the external information processing apparatus 4 performs communication with another information processing apparatus (not shown) connected to the external network 1.

It is to be noted that, in the radio communication system of FIG. 1, only one access point 2 and only one radio communication apparatus 3 are shown for the simplified illustration and description. Naturally, however, the radio communication system to which the present invention is applied can include a plurality of access points including the access point 2 and a plurality of radio communication apparatus including the radio communication apparatus 3.

In other words, in the radio communication system to which the present invention is applied, a radio network including such a 1:1 communication form as shown in FIG. 1 is constructed, and radio communication is performed through the radio network.

The access point 2 includes a radio communication apparatus 11 which performs radio communication with the radio communication apparatus 3 through the radio circuit 23 and an information repeating apparatus 12 which repeats information to be transferred between the radio communication apparatus 11 and the network 1.

The information repeating apparatus 12 is connected to the network 1 through the wire circuit 21 and connected to the radio communication apparatus 11 through a wire circuit 22, and supplies information supplied thereto from the network 1 through the wire circuit 21 to the radio communication apparatus 11 through the wire circuit 22. Further, the information repeating apparatus 12 supplies information supplied thereto from the radio communication apparatus 11 through the wire circuit 22 to the network 1 through the wire circuit 21.

The radio communication apparatus 11 supplies information supplied thereto through the wire circuit 22, that is, information supplied thereto from the network 1 through the wire circuit 21, information repeating apparatus 12 and wire circuit 22, to the radio communication apparatus 3 through the radio circuit 23. Further, the radio communication apparatus 11 supplies information supplied thereto through the radio circuit 23, that is, information supplied thereto from the radio communication apparatus 3 through the radio circuit 23, to the information repeating apparatus 12 through the wire circuit 22. In other words, the radio communication apparatus 11 is a converter which converts a signal transmitted thereto through a radio network which utilizes the radio circuit 23 into a signal which can be transmitted by the wire circuit 22 and converts a signal transmitted thereto through the wire circuit 22 into a signal which can be transmitted in a radio network which utilizes the radio circuit 23.

The radio communication apparatus 3 supplies information transmitted thereto through the wire circuit 24, that is, information supplied thereto from the information processing apparatus 4 through the wire circuit 24, to the radio communication apparatus 11 through the radio circuit 23. Further, the radio communication apparatus 3 supplies information transmitted thereto through the radio circuit 23, that is, information supplied thereto from the radio communication apparatus 11 through the radio circuit 23, to the information processing apparatus 4 through the wire circuit 24. In other words, also the radio communication apparatus 3 is a converter which converts a signal transmitted thereto through a radio network which utilizes the radio circuit 23 into a signal which can be transmitted by the wire circuit 24 and converts a signal transmitted thereto through the wire circuit 24 into a signal which can be transmitted within a radio network which utilizes the radio circuit 23.

Accordingly, where the wire circuit 22 and the wire circuit 24 are used in accordance with the same communication system (standards), the radio communication apparatus 3 and the radio communication apparatus 11 can be formed as apparatus which have constructions and functions basically similar to each other as hereinafter described, for example, with reference to FIGS. 2 to 4 or FIGS. 6 to 8.

The forms of the network 1 and the information processing apparatus 4 are not limited particularly and may individually be various forms. For example, as the network 1, the Internet or the Ethernet (registered trademark) can be applied. Meanwhile, as the information processing apparatus 4, for example, it is possible to apply a personal computer or otherwise apply a household electric appliance such as a television receiver, a video tape recorder or a hard disk recorder.

It is to be noted that, in the following description, it is assumed that the network 1 is the Ethernet (registered trademark). In other words, in this instance, the standards prescribed by the Ethernet (registered trademark) are adopted for the communication system for wire communication.

Also the radio communication system for radio communication is not limited particularly, and for example, such standards as those of the Bluetooth may be adopted. In the following description, however, it is assumed that the standards of the IEEE 802.11a, 802.11b or 802.11g are adopted.

Incidentally, setting for radio communication in the radio communication system of the present embodiment is executed through the radio circuit 23.

Here, to set information (hereinafter referred to as communication information) necessary for construction of a radio network to individual radio communication apparatus (in the present case, the radio communication apparatus 11 and the radio communication apparatus 3) connected to the radio network is referred to as setting for radio communication.

In other words, before a radio network is constructed, setting for radio communication for constructing the radio network is performed through radio communication. Accordingly, in the present embodiment, a state in which normal radio communication, that is, radio communication between radio communication apparatus between which a connection is established through a negotiation after a radio network is constructed, is performed and another state in which radio communication for setting, that is, radio communication before the radio network is constructed, is performed are distinguished definitely from each other. The former state is hereinafter referred to as normal state, and the latter state is hereinafter referred to as radio communication setting state.

Therefore, the radio communication apparatus 11 includes a setting switch 31 for changing the state thereof from the normal state to the radio communication setting state. In particular, the setting switch 31 generates a trigger signal for causing the radio communication apparatus 11 to start setting for radio communication through a depression operation thereof by the user.

Similarly, also the radio communication apparatus 3 includes a setting switch 41 for changing the state thereof from the normal state to the radio communication setting state. In particular, the setting switch 41 generates a trigger signal for causing the radio communication apparatus 3 to start setting for radio communication through a depression operation thereof by the user.

Accordingly, if the user depresses the setting switch 31 and the setting switch 41, or more particularly if the user depresses both of the setting switch 31 and the setting switch 41 at any timings within a fixed period of time as hereinafter described, then a process for setting for radio communication is started between the radio communication apparatus 11 and the radio communication apparatus 3. In particular, the radio communication apparatus 11 and the radio communication apparatus 3 individually change the state thereof from the normal state to the radio communication setting state.

Thus, the radio communication apparatus 3 issues a request for first information for identification of the radio network and second information regarding the security as communication information necessary for communication through the radio network to the radio communication apparatus 11 (access point 2) through the radio circuit 23. In particular, the radio communication apparatus 3 produces information (hereinafter referred to as communication information request) for requesting for the first information and the second information and transmits the produced information to the radio communication apparatus 11 (access point 2) through the radio circuit 23.

The type of the communication information request is not limited particularly and may be information produced newly for setting for radio communication or may be predetermined existing information. In the present case, since the standards of the IEEE 802.11a, 802.11b or 802.11g are adopted, predetermined existing information such as, for example, a probe request or a management frame can be applied.

It is to be noted that a probe request utilized for setting for radio communication, that is, a probe request utilized as a communication information request, is hereinafter referred to as special probe request in order to distinguish the same from a normal probe request, that is, a probe request utilized to issue a connection request to an opposite party of communication (or a broadcast may be used) after a radio network is constructed.

The radio communication apparatus 11 (access point 2) transmits the first information and the second information set in advance in the radio communication apparatus 11 itself as a response to the communication information request received from the radio communication apparatus 3 through the radio circuit 23 to the radio communication apparatus 3 through the radio circuit 23.

In this instance, for example, if the communication information request is a special probe request, then the radio communication apparatus 11 (access point 2) can transmit the communication information in such a form that it is included in the probe response. In particular, in a probe response to the normal probe request, a field for including the first information (that is, identification information of a radio network) is prepared. Therefore, when the radio communication apparatus 11 (access point 2) receives a special probe request transmitted thereto from the radio communication apparatus 3, it can produce a probe response including not only the first information (that is, identification information of the radio network) but also second information (that is, information regarding the security) as a response to the received special probe request and transmit the probe response to the radio communication apparatus 3.

It is to be noted that such a probe response to the special probe request as just described, that is, in the present case, the probe response including the first information (that is, identification information of the radio network) and the second information (that is, information regarding the security), is hereinafter referred to as special probe response in a corresponding relationship to the special probe request.

On the other hand, for example, where a management frame is utilized for transmission of a communication information request, the radio communication apparatus 11 (access point 2) can utilize a management frame also for transmission of the communication information (in the present case, the first information and the second information).

In this manner, such existing information as a probe request and a probe response or a management frame can be utilized also as information to be exchanged for setting for radio communication (information to be exchanged by radio communication). In other words, the necessity to define new information and use the defined new information only for setting for radio communication is eliminated. As a result, setting for radio communication can be performed readily at a reduced cost.

It is to be noted that the types and the number of the types of pieces of the two different kinds of information of the first and second information used as the communication information, that is, the identification of a radio network to be constructed and the information regarding the security, are not limited particularly. Here, however, since the standards of the IEEE 802.11a, 802.11b or 802.11g are adopted as the radio communication system, for example, an SSID is adopted as the identification and a WEP key is adopted as the information regarding the security.

If the setting for radio communication is completed in this manner, then the radio communication apparatus 11 and the radio communication apparatus 3 can thereafter perform radio communication with each other after they perform an ordinary negotiation. In particular, the information processing apparatus 4 can communicate with another information processing apparatus (not shown) connected to the network 1 through the radio communication apparatus 3, access point 2 (radio communication apparatus 11 and information repeating apparatus 12) and network 1.

It is to be noted that, where the radio communication apparatus 11 of the access point 2 does not have such communication information as an SSID or a WEP key set therein in advance, the access point 2 itself can produce communication information and set it to the access point 2 itself. Although a trigger to the process just described (process of producing and setting communication information by the access point 2) is not limited particularly, it is assumed here that, for example, the fact that the setting switch 31 is kept depressed for more than a fixed period of time is used as a trigger to start the process.

In this manner, according to the present embodiment, the user can perform setting for radio communication between the radio communication apparatus 3 and the access point 2 (radio communication apparatus 11) only by performing such a simple operation as an operation of depressing the setting switch 31 of the radio communication apparatus 11 and the setting switch 41 of the radio communication apparatus 3. In other words, the first and second subjects of the conventional apparatus described hereinabove can be solved.

Further, in the present embodiment, since not only identification information of a radio network but also information regarding the security are set, the safety in radio communication in the radio network after the setting can be anticipated. In other words, the third subject of the conventional apparatus described hereinabove can be solved.

It is to be noted that, while, in the present embodiment, the setting switch 31 and the setting switch 41 are formed as hardware switches for exclusive use, they may otherwise be formed as software switches, or some other switches having different functions which may be software or hardware may be used also as the switches.

It is to be noted, however, where the setting switch 31 or the setting switch 41 is a software switch, a display section for displaying the switch thereon and an operation section for operating the switch displayed on the display section are required as components of the radio communication apparatus 11 or the radio communication apparatus 3.

Further, where the setting switch 31 and the setting switch 41 are provided as switches for exclusive use, the user can recognize the functions of the switches readily. In other words, the user can understand readily that the setting switch 31 and the setting switch 41 are switches for exclusive use for setting radio communication. Therefore, the user can feel that the operations for setting for radio communication are easy. In other words, the first and second subjects of the conventional apparatus described hereinabove can be solved.

Furthermore, the order of depression operations of the setting switch 31 and the setting switch 41 is not limited particularly, but only it is necessary that one of the setting switch 31 and the setting switch 41 be depressed before a predetermined period of time elapses after the other of them is depressed as hereinafter described. Also such flexibility in operation can cause the user to feel that the operations for setting the radio communication are easy. In other words, the first and second subjects of the conventional apparatus can be solved.

Now, examples of detailed constructions of the radio communication apparatus 11 of the access point 2, the information repeating apparatus 12 and the radio communication apparatus 3 connected to the information processing apparatus 4 are described individually in order with reference to FIGS. 2 to 8.

Figure 3:
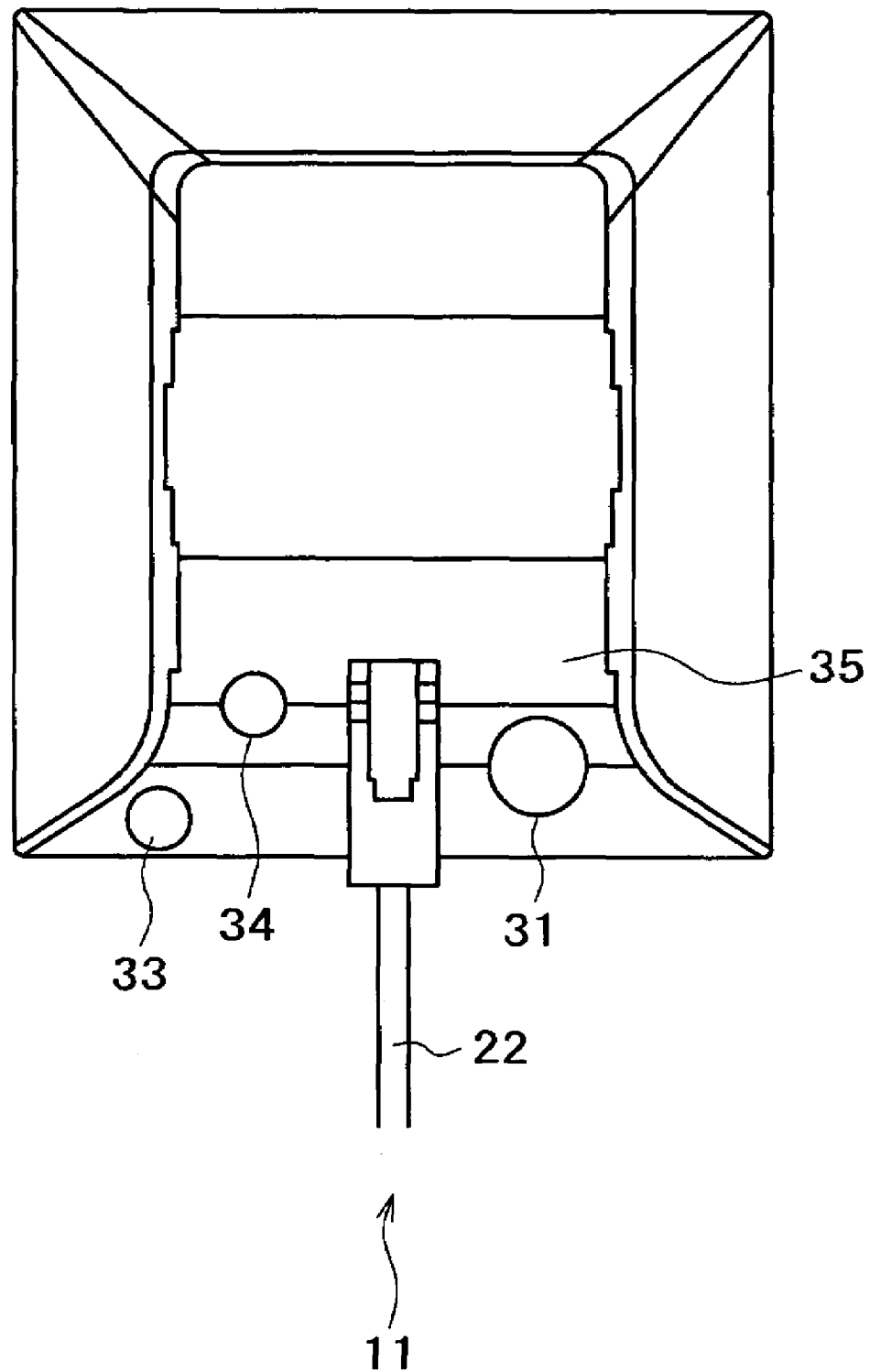
FIG. 3 is a rear elevational view showing the example of the appearance of the radio communication apparatus of FIG. 3.

FIGS. 2 and 3 show an example of an appearance of the radio communication apparatus 11 of the access point 2. More particularly, FIGS. 2 and 3 are a front elevational view and a rear elevational view of the radio communication apparatus 11, respectively.

Referring first to FIG. 2, a light emitting diode (LED 32) is provided at a lower portion of a front face in FIG. 1 of the radio communication apparatus 11, and the wire circuit 22 is connected to one of side faces perpendicular to the front face which is positioned below the LED 32 in FIG. 2. In this instance, the wire circuit 22 particularly is, for example, a LAN cable for the Ethernet (registered trademark).

FIG. 3 shows a rear face of the radio communication apparatus 11 to which a cover 35 is attached, that is, a face of the radio communication apparatus 11 opposite to the front face of FIG. 2. A switch 33, another LED 34 and the setting switch 31 described hereinabove are provided in order from the left at a lower portion of the rear face of the radio communication apparatus 11. The switch 33 has a function allocated thereto which is different from the function for setting for radio communication, that is, a function different from the function of the setting switch 31 is allocated to the switch 33. More particularly, for example, if the switch 33 is depressed, then a setting upon shipment from a factory is restored.

Figure 4:
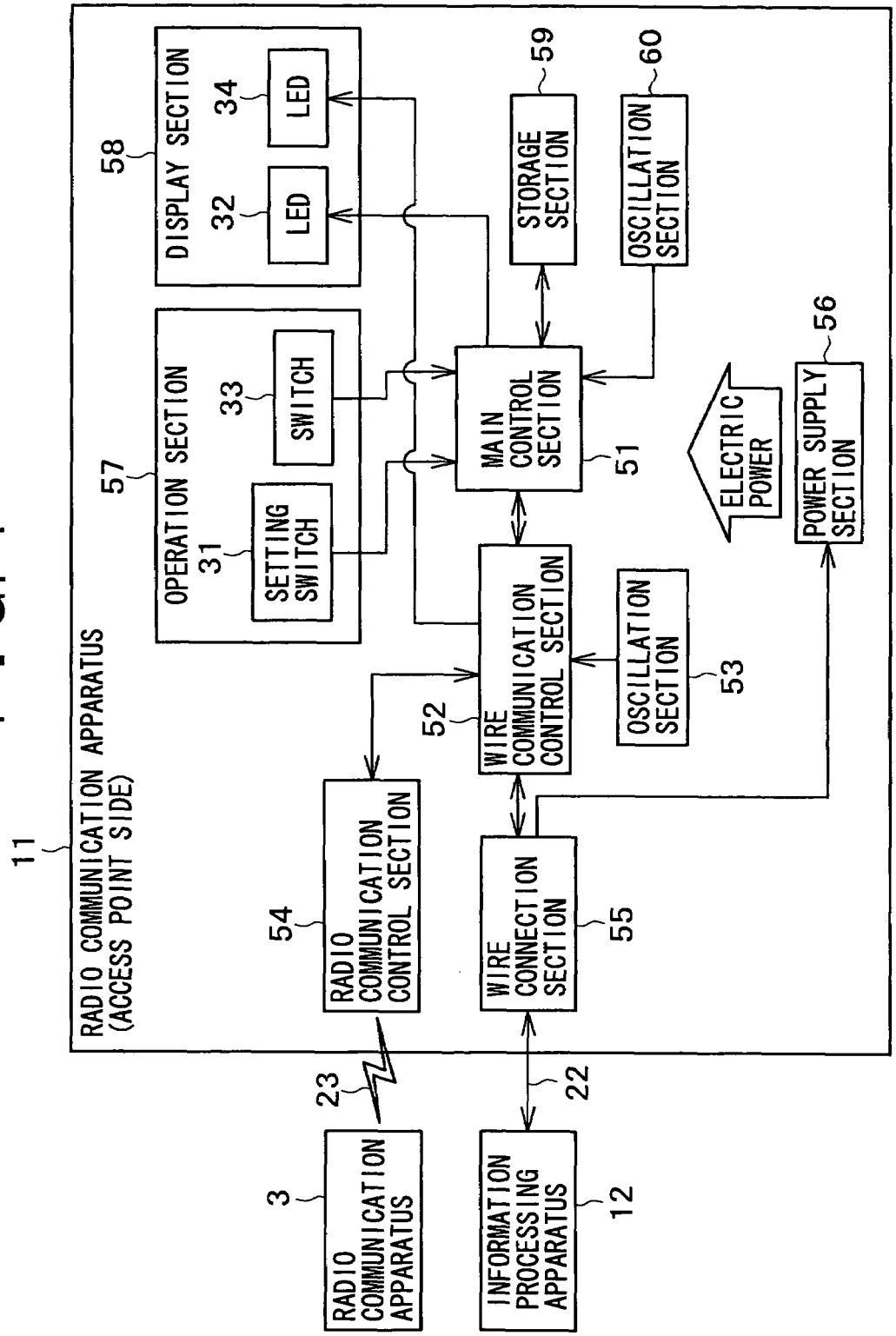
FIG. 4 is a block diagram showing an example of a detailed construction of the radio communication apparatus shown in FIG. 3.

FIG. 4 is a block diagram showing an example of an internal construction of the radio communication apparatus 11 of the access point 2.

Referring to FIG. 4, a main control section 51 controls operation of the entire radio communication apparatus 11 in synchronism with a clock of a predetermined frequency such as, for example, 48 MHz oscillated from an oscillation section 60.

A wire communication control section 52 controls, under the control of the main control section 51, wire communication with a different information processing apparatus (in the present case, the information repeating apparatus 12) connected to a wire connection section 55 through the wire circuit 22 in synchronism with a clock of a predetermined frequency (for example, 25 MHz) oscillated from an oscillation section 53.

An end of the wire circuit 22 is connected to the wire connection section 55. In other words, the wire connection section 55 is an interface with a different wire communication apparatus (in the present case, the information repeating apparatus 12) to which the other end of the wire circuit 22 is connected. More particularly, for example, in the present case, since the wire circuit 22 is a LAN cable for the Ethernet (registered trademark), the wire connection section 55 is a port for connection of a terminal of the LAN cable for the Ethernet (registered trademark).

A radio communication control section 54 controls radio communication with a different radio communication apparatus (in the present case, the radio communication apparatus 3), connected thereto through a radio network which uses the radio circuit 23.

In particular, the radio communication control section 54 and the wire communication control section 52 convert information transmitted thereto from the radio communication apparatus 3 through the radio circuit 23 into a signal for wire transmission and supply the resulting signal to the information repeating apparatus 12 through the wire connection section 55 and the wire circuit 22. Further, the radio communication control section 54 and the wire communication control section 52 convert a signal transmitted through a wire circuit, that is, a signal transmitted from the information repeating apparatus 12 and received through the wire circuit 22 and the wire connection section 55, into a signal for radio transmission and transmits the resulting signal to the radio communication apparatus 3 through the radio circuit 23.

A power supply section 56 supplies electric power supplied thereto from an external power supply (FIG. 5) through the information repeating apparatus 12, wire circuit 22 and wire connection section 55 to the entire radio communication apparatus 11. It is to be noted that, while an arrow mark indicating that the electric power is supplied to the entire radio communication apparatus 11 is shown in FIG. 4, actually the power supply section 56 supplies the electric power with individually corresponding voltages to the individual components of the radio communication apparatus 11 such as a display section 58. More particularly, when a dc voltage of, for example, +12 V is applied from the wire connection section 55, the power supply section 56 produces a dc voltage of +3.3 V by means of a switching regulator built therein and outputs the dc voltage of +3.3 V to those components of the radio communication apparatus 11 which require the voltage. The power supply section 56 further produces another dc voltage of +1.8 V from the dc voltage of +3.3 V by means of a linear regulator built therein and supplies the dc voltage of +1.8 V to those components of the radio communication apparatus 11 which require the voltage.

In other words, the electric power to be used by the radio communication apparatus 11 is supplied from a different apparatus connected to the wire connection section 55 through the wire circuit 22. Accordingly, the connection of the radio communication apparatus 11 to a different apparatus (in the present instance, the information repeating apparatus 12) through the wire circuit 22 signifies also that the power supply to the radio communication apparatus 11 is placed into an on state.

An operation section 57 includes the setting switch 31 and the switch 33 described above and other necessary elements and supplies a signal based on an operation of the user thereof to the main control section 51.

The display section 58 includes the LED 32 and the LED 34 described hereinabove and other necessary elements and displays, for example, a state that information is being sent or received and so forth. It is to be noted here that the LED 32 is controlled by the main control section 51 while the LED 34 is controlled by the wire communication control section 52.

Though not shown, a storage section 59 includes, for example, a flash ROM (Read Only Memory) or an SDRAM (Synchronous Dynamic Random Access Memory) or else a combination of a flash ROM and an SDRAM and stores information (including programs) necessary for the main control section 51 to execute various processes.

In particular, the main control section 51 controls executions of various processes in accordance with a program loaded into the SDRAM from among programs recorded in the flash ROM. Also data and so forth necessary for the main control section 51 to execute various processes is suitably stored into the SDRAM.

Figure 5:
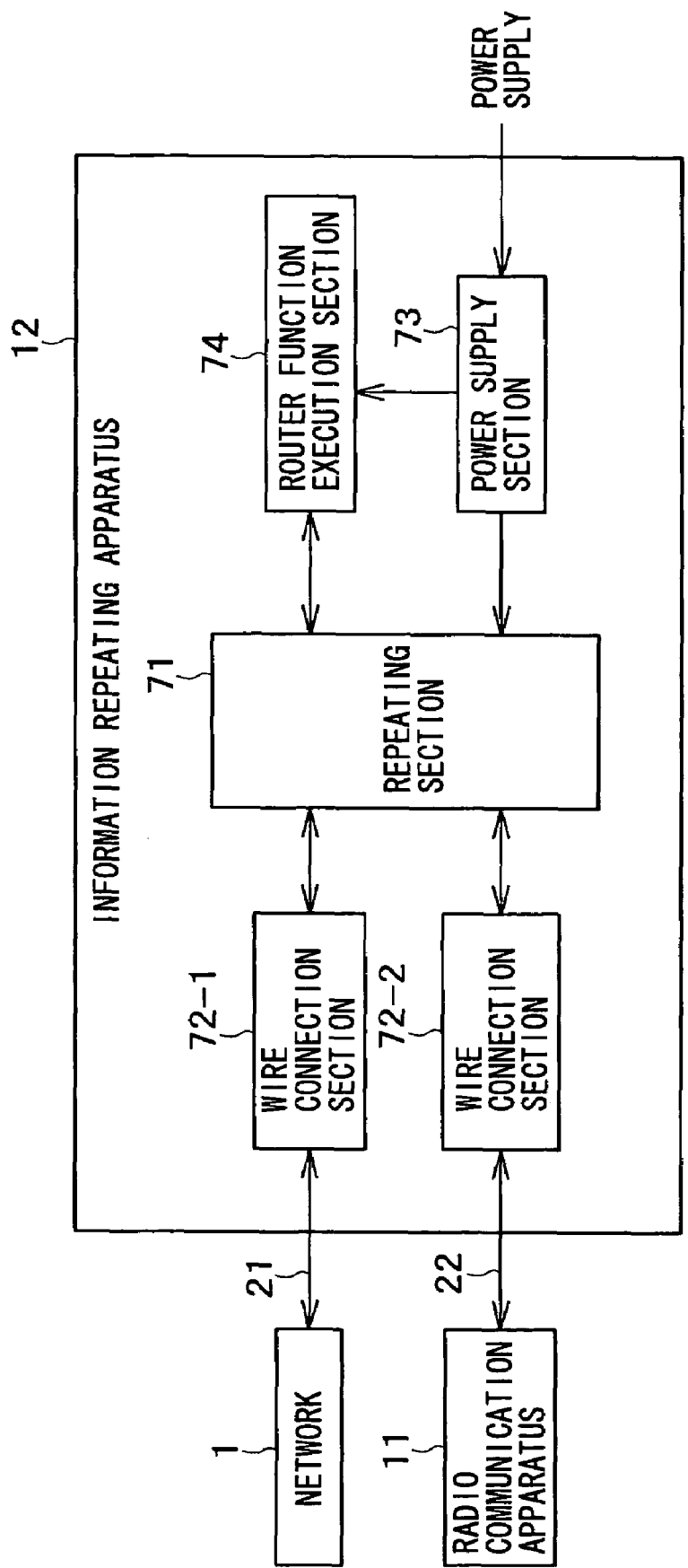
FIG. 5 is a block diagram showing an example of a detailed construction of an information repeating apparatus of the access point shown in FIG. 1.

FIG. 5 is a block diagram showing an example of a detailed construction of the information repeating apparatus 12 of the access point 2.

Referring to FIG. 5, the information repeating apparatus 12 include one or more wire connection sections 72, for example, two wire connection sections 72-1 and 72-2. The wire connection sections 72 are connected to each other physically (by a wire circuit) through a repeating section 71. In particular, the information repeating apparatus 12 repeats information to be exchanged to and from apparatus individually connected to the wire connection sections 72-1 and 72-2.

More particularly, for example, where, as shown in FIG. 5, one end of the wire circuit 21 is connected to the wire connection section 72-1 while the network 1 (different information processing apparatus not shown) is connected to the other end of the wire circuit 21 and one end of the wire circuit 22 is connected to the wire connection section 72-2 while the radio communication apparatus 11 is connected to the other end of the wire circuit 22, information supplied from the network 1 is supplied to the radio communication apparatus 11 through the wire circuit 21, wire connection section 72-1, repeating section 71, wire connection section 72-2 and wire circuit 22. Meanwhile, information supplied from the radio communication apparatus 11 is supplied to the network 1 through the wire circuit 22, wire connection section 72-2, repeating section 71, wire connection section 72-1 and wire circuit 21.

In this manner, the wire connection sections 72-1 and 72-2 interface with a radio communication apparatus (in the present case, a different wire communication apparatus connected to the network 1 or the radio communication apparatus 11 which functions as a wire communication apparatus) similarly to the wire connection section 55 (FIG. 4). More particularly, since, for example, in the present case, the wire circuit 21 and wire circuit 22 are each formed from a LAN cable for the Ethernet (trademark), each of the wire connection sections 72-1 and 72-2 is formed as a port for connection of a terminal of a LAN cable for the Ethernet (trademark).

A power supply section 73 supplies electric power supplied thereto from an external power supply to a router function execution section 74. Further, the power supply section 73 supplies the electric power supplied thereto from the external power supply to the radio communication apparatus 11 through the repeating section 71 and the wire connection section 72-2.

The information repeating apparatus 12 further includes a router function execution section 74 as occasion demands (where no router is connected to the network 1). The router function execution section 74 executes functions of a router.

The functions of a router include, for example, a function of analyzing a protocol of a network layer (third layer) or a transport layer (fourth layer) defined by the "OSI (Open Systems Interconnection) basic reference model" to perform transfer. More particularly, the functions of a router include, for example, a path selection function of checking an address of the network layer to discriminate which one of paths should be used for transfer. Also, for example, a function of abandoning all data other than data of a protocol or protocols for which the router itself is ready is included.

It is to be noted that the "OSI basic reference level" is a model wherein communication functions which a computer should have are divided into seven layers and a standard function module is defined for each layer based on the design policy "OSI" of a network structure for implementing data communication between different types prescribed by the ISO.

However, where some other router (not shown) is connected to the network 1, the router function execution section 74 is not a component essentially required by the information repeating apparatus 12.

Figure 6:
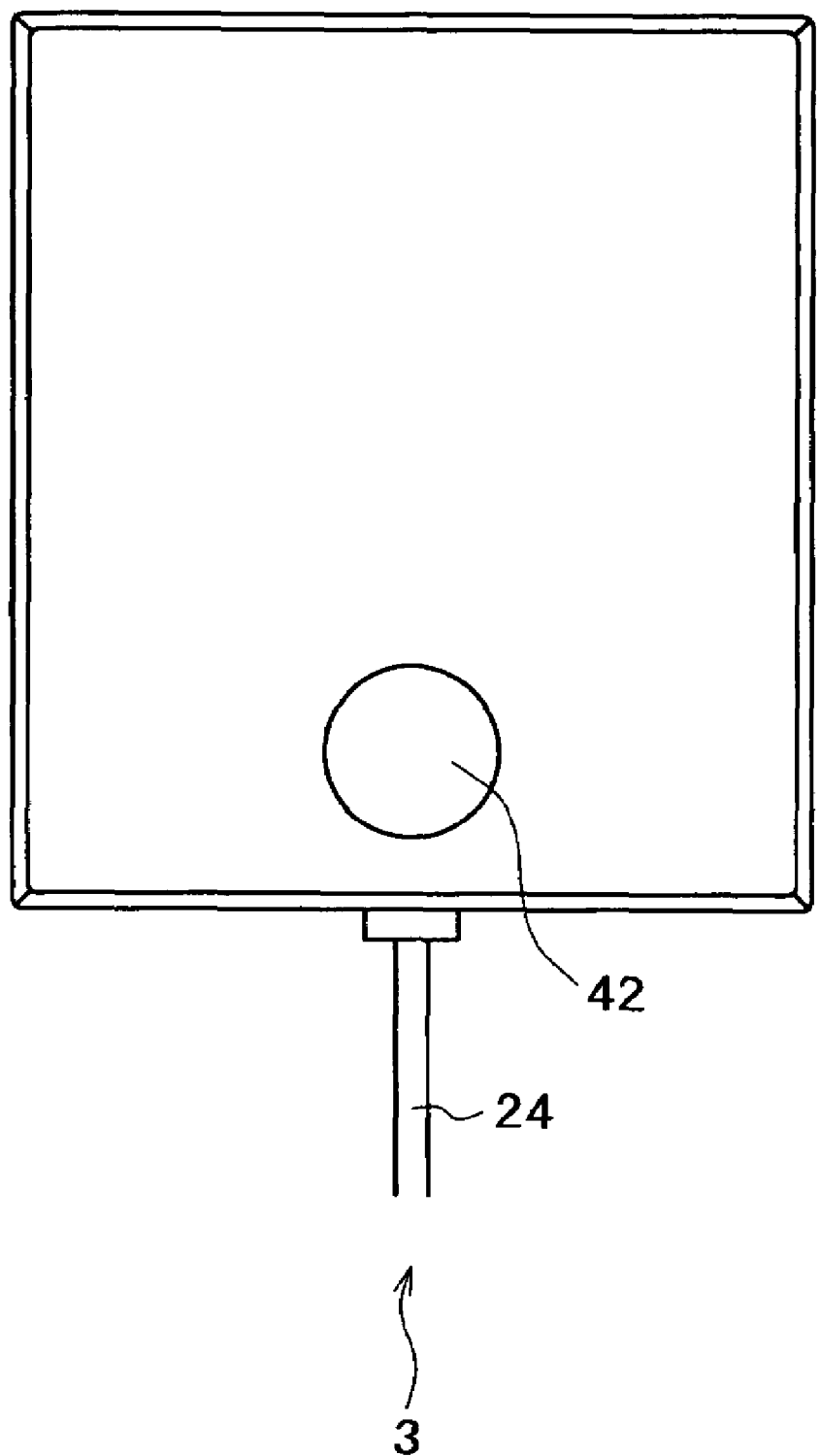
FIG. 6 is a front elevational view showing an example of a construction of an appearance of a radio communication apparatus connected to an information processing apparatus shown in FIG. 1.
Figure 7:
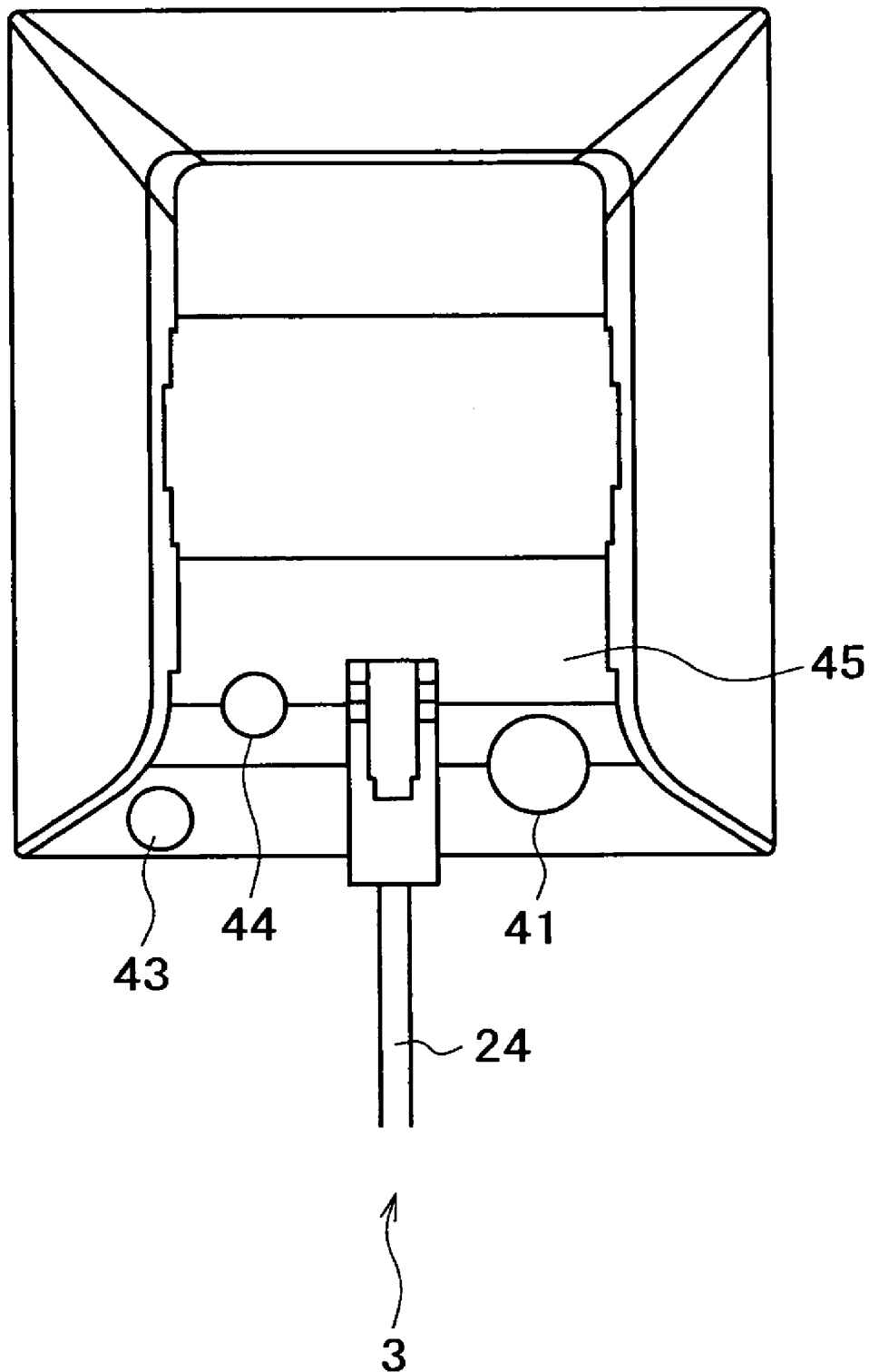
FIG. 7 is a rear elevational view showing the example of the construction of the radio communication apparatus shown in FIG. 6.

FIGS. 6 and 7 show an example of an appearance of the radio communication apparatus 3 connected to the information processing apparatus 4. As described hereinabove, the radio communication apparatus 3 may have a construction and functions similar to those of the radio communication apparatus 11. Therefore, FIGS. 6 and 7 which show an example of an appearance of the radio communication apparatus 3 are basically similar to FIGS. 2 and 3 which show an example of an appearance of the radio communication apparatus 11 described hereinabove. Therefore, further description of the radio communication apparatus 3 is not given with reference to FIGS. 6 and 7.

Similarly, FIG. 8 is a block diagram showing an example of an internal construction of the radio communication apparatus 3 connected to the information processing apparatus 4 and is a figure basically similar to FIG. 4 which shows an example of an internal setting of the radio communication apparatus 11. In particular, components of the radio communication apparatus 3 from a main control section 91 to an oscillation section 100 shown in FIG. 8 have a setting and functions basically similar to those of the components of the radio communication apparatus 11 from the main control section 51 to the oscillation section 60 shown in FIG. 4, respectively. Accordingly, further description of the components of the radio communication apparatus 3 is not given with reference to FIG. 8.

Figure 9:
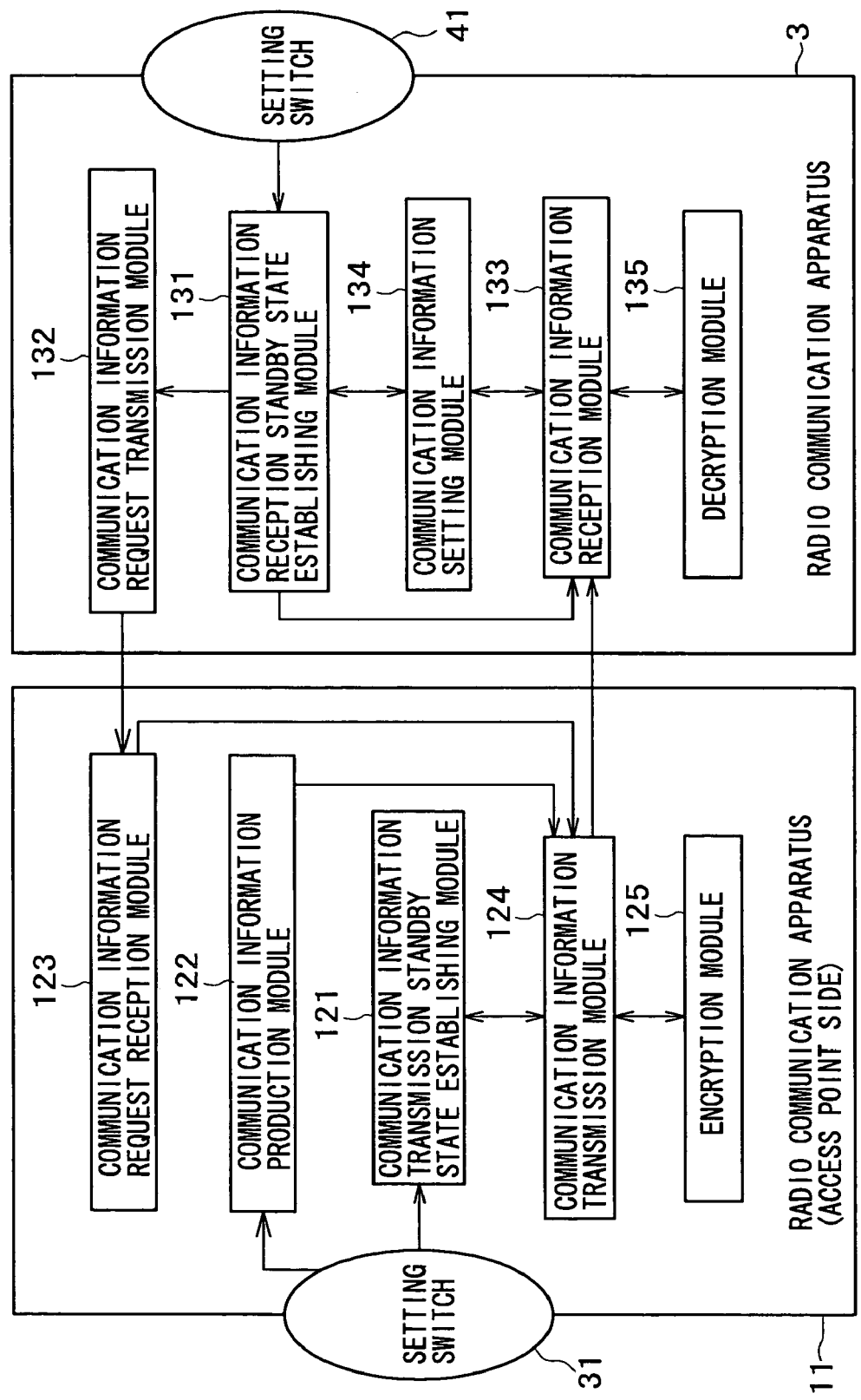
FIG. 9 is a functional block diagram showing an example of a construction of software for executing a setting function for radio communication of the radio communication apparatus connected to the information processing apparatus shown in FIG. 1 and the radio communication apparatus of the access point shown in FIG. 1.

FIG. 9 shows an example of a construction of pieces of software for execution of setting radio communication by the radio communication apparatus 11 (access point side) and the radio communication apparatus 3. Each of the pieces of software is formed from a plurality of modules as seen in FIG. 9. Each module has an independent algorithm and executes unique operations in accordance with the algorithm. In particular, for example, the modules of the radio communication apparatus 11 are stored in the flash ROM not shown of the storage section 59 shown in FIG. 4 and are suitably read out (and developed in the SDRAM not shown of the storage section 99) and executed by the main control section 51. Similarly, for example, the modules of the radio communication apparatus 3 are stored in the flash ROM not shown of the storage section 99 shown in FIG. 8 and are suitably read out (and developed in the SDRAM not shown of the storage section 99) and executed by the main control section 91.

Paying attention to the radio communication apparatus 11 in FIG. 9, a communication information transmission standby state establishing module 121 changes the state of the radio communication apparatus 11.

In particular, the radio communication apparatus 11 is normally in the normal state wherein it can communicate with another radio communication apparatus by radio communication. If the setting switch 31 is depressed in the normal state, then the radio communication apparatus 11 changes the state thereof from the normal state to the radio communication setting state. To the radio communication apparatus 11, the radio communication setting state is considered to be a state wherein it can transmit communication information (in the present case, an SSID and a WEP key) to another radio communication apparatus (in the present case, the radio communication apparatus 3) with which the radio communication apparatus 11 tries to execute radio communication. Therefore, the radio communication setting state of the radio communication apparatus 11 is hereinafter referred to as communication information transmission standby state.

Thus, if the communication information transmission standby state establishing module 121 detects, for example, that the setting switch 31 is depressed, then it changes the state of the radio communication apparatus 11 from the normal state to the communication information transmission standby state. On the other hand, if, for example, a communication information transmission module 124 hereinafter described detects that control for transmitting communication information is completed, then the communication information transmission standby state establishing module 121 changes the state of the radio communication apparatus 11 from the communication information transmission standby state to the normal state.

If it is detected that, for example, the setting switch 31 is kept depressed for more than a fixed period of time, then a communication information production module 122 produces communication information (in the present case, an SSID and a WEP key) necessary for radio communication and supplies the produced information to the communication information transmission module 124. Further, the communication information production module 122 uses the produced communication information to perform setting for radio communication for the radio communication apparatus 11 (access point 2) itself. The method for production of the communication information is not limited particularly, and, for example, where a WEP key of 128 bits is adopted, the communication information production module 122 can generate a random number and produce a WEP key of 128 bits and an SSID from the generated random number.

It is to be noted that, where it is presupposed that communication information is set in advance in the radio communication apparatus 11, the communication information production module 122 is not essentially required as a component of the radio communication apparatus 11. However, in the following description, it is assumed that communication information is produced by the communication information production module 122.

A communication information request reception module 123 controls the radio communication apparatus 11 to receive a communication information request transmitted thereto from the radio communication apparatus 3 through a radio circuit. Then, if the communication information request reception module 123 confirms that it has received a communication information request normally by the radio communication apparatus 11 thereof, then it notifies the communication information transmission module 124 of the confirmation.

The communication information transmission module 124 controls, if it receives, from the communication information request reception module 123, a notification that a communication information request has been received, the radio communication apparatus 11 to transmit communication information (which may be in a form encrypted by an encryption module 125 as hereinafter described) produced in advance by the communication information production module 122 to the radio communication apparatus 3 through a radio circuit. Further, when the transmission control comes to an end, that is, when it is confirmed that the communication information has been transmitted normally from the radio communication apparatus 11, the communication information transmission module 124 notifies the communication information transmission standby state establishing module 121 of the normal transmission. Thus, the communication information transmission standby state establishing module 121 receives the notification and changes the state of the radio communication apparatus 11 from the communication information transmission standby state back to the normal state as described hereinabove.

The encryption module 125 encrypts communication information produced by (or set in advance in) the communication information production module 122 and supplied to the communication information transmission module 124. In particular, if communication information is supplied from the communication information transmission module 124 to the encryption module 125 before it is transmitted, then the encryption module 125 utilizes a predetermined encryption method to encrypt the communication information and supplies the encrypted communication information to the communication information transmission module 124. The communication information transmission module 124 controls the radio communication apparatus 11 to transmit the encrypted communication information to the radio communication apparatus 3.

Where the communication information is encrypted in this manner, the safety in communication can be further enhanced. In particular, in the present embodiment, setting for radio communication is performed between radio communication apparatus of objects of the radio communication (in the present case, between the radio communication apparatus 11 and the radio communication apparatus 3) by radio communication (radio communication before a radio network is constructed). Therefore, there is the possibility that the communication information may leak. In such an instance, if the communication information is in an encrypted form, then even if the communication information leaks to a different information processing apparatus, it is difficult for the different information processing apparatus to read or decrypt the communication information. In other words, even if the communication information leaks, if it is in an encrypted form, the contents can be protected.

It is to be noted that the encryption method is not limited particularly, and for example, the common key cryptography can be applied as the encryption method.

The common key cryptography is a cryptographic algorithm which has a property that a cryptographic key used for encryption of data and a cryptographic key used for decryption are the same as each other or, even where the two cryptographic keys are different from each other, it is easy to calculate one of the cryptographic keys from the other cryptographic key. As the common cryptography, for example, the DES (Data Encryption Standard) and the Triple DES adopted by the National Bureau of Standards in the U.S. Department of Commerce and the FEAL (Fast Data Encipherment Algorithm) developed by NTT (Nippon Telegraph and Telephone Corp. (trade name)) are known.

In particular, for example, the radio communication apparatus 3 first transmits a common key to the radio communication apparatus 11 by some method (for example, by including the common key in a communication information request).

The encryption module 125 uses the common key to encrypt the communication information, and the radio communication apparatus 11 supplies the encrypted communication information to the radio communication apparatus 3 by wire communication under the control of the communication information transmission module 124.

The radio communication apparatus 3 (a decryption module 135 hereinafter described) can use the common key sent formerly to the radio communication apparatus 11 to decipher the encrypted communication information to acquire the communication information.

It is to be noted that such a common key encryption method as described above is decided, for example, as a standardized method in the ISO/IEC (International Electro technical Commission) 9798-2 and is a technique which can be recognized readily by those skilled in the art, and therefore, detailed description of it is omitted herein.

Also it is possible to alternatively utilize, for example, the SSL (Secure Socket Layer) or the TLS (Transport Layer Security) as the encryption method.

The SSL or the TLS is a security technique which can prevent such threats as "wiretapping", "falsification" or "spoofing" on a network.

It is to be noted that the SSL was developed by Netscap (trade name) and has been popularized as a cryptographic communication protocol on a network such as the Internet. The TLS was developed and standardized by the IETF (Internet Engineering Task Force), and the RFC (Request For Comments) 2246 is laid open. Accordingly, a great number of documents have been published on details of the SSL and the TLS, and the SSL and the TLS are techniques which can be recognized readily by those skilled in the art. Therefore, detailed description of them is omitted herein.

Now, notice is taken of the radio communication apparatus 3 connected to the information processing apparatus 4. A communication information reception standby state establishing module 131 changes the state of the radio communication apparatus 3.

In particular, when the radio communication apparatus 3 is in the normal state, if the setting switch 41 is depressed, then the radio communication apparatus 3 changes the state thereof from the normal state to a radio communication setting state. To the radio communication apparatus 3, the radio communication setting state can be considered to be a state wherein it can receive communication information (in the present case, an SSID and a WEP key) transmitted thereto from a radio communication apparatus (in the present case, the radio communication apparatus 11) with which the radio communication apparatus 3 tries to communicate. Therefore, the radio communication setting state of the radio communication apparatus 3 is hereinafter referred to as communication information reception standby state.

Thus, for example, if it is detected that the setting switch 41 is depressed, then the communication information reception standby state establishing module 131 changes the state of the radio communication apparatus 3 from the normal state to the communication information reception standby state and notifies a communication information request transmission module 132 of the change of the state.

Further, for example, if a communication information setting module 134 hereinafter described detects that setting for radio communication of the radio communication apparatus 3 itself has been performed (is completed), then the communication information reception standby state establishing module 131 changes the state of the radio communication apparatus 3 from the communication information reception standby state to the normal state.

If a notification that the state of the radio communication apparatus 3 has changed to the communication information reception standby state is received from the communication information reception standby state establishing module 131, that is, if the setting switch 41 is depressed, then the communication information request transmission module 132 produces a communication information request and controls the radio communication apparatus 3 to transmit the communication information request to the radio communication apparatus 11 by radio communication.

A communication information reception module 133 controls the radio communication apparatus 3 to receive communication information (in the present case, an SSID and a WEP key) transmitted thereto from the radio communication apparatus 11 by radio communication.

Further, if the communication information received by the radio communication apparatus 3 is in an encrypted form, then the communication information reception module 133 supplies the encrypted communication information to the decryption module 135. Then, when the communication information decrypted by the decryption module 135 is supplied to the communication information reception module 133, the communication information reception module 133 supplies the decrypted communication information to the communication information setting module 134.

On the other hand, if the communication information received by the radio communication apparatus 3 is not in an encrypted form, then the communication information reception module 133 supplies the communication information as it is to the communication information setting module 134.

If communication information is supplied from the communication information reception module 133 to the communication information setting module 134, then the communication information setting module 134 sets the communication information supplied thereto into the radio communication apparatus 3 itself.

Then, when the setting for radio communication is completed, the communication information setting module 134 notifies the communication information reception standby state establishing module 131 of the completion. The communication information reception standby state establishing module 131 receives the notification and changes the state of the radio communication apparatus 3 from the communication information reception standby state back into the normal state.

Figure 10:
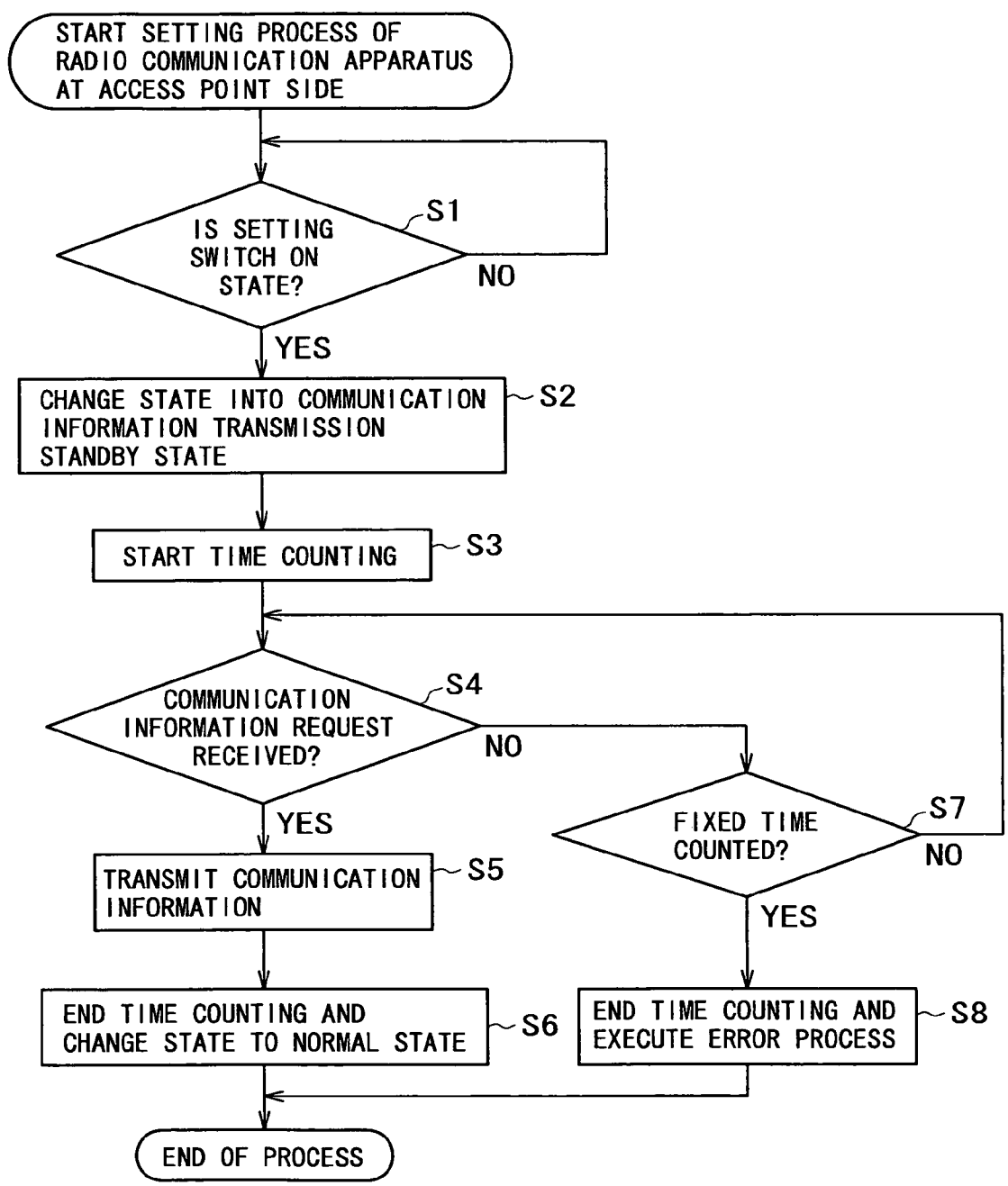
FIG. 10 is a flow chart illustrating an example of a setting process for radio communication of the radio communication apparatus of the access point shown in FIG. 1.
Figure 11:
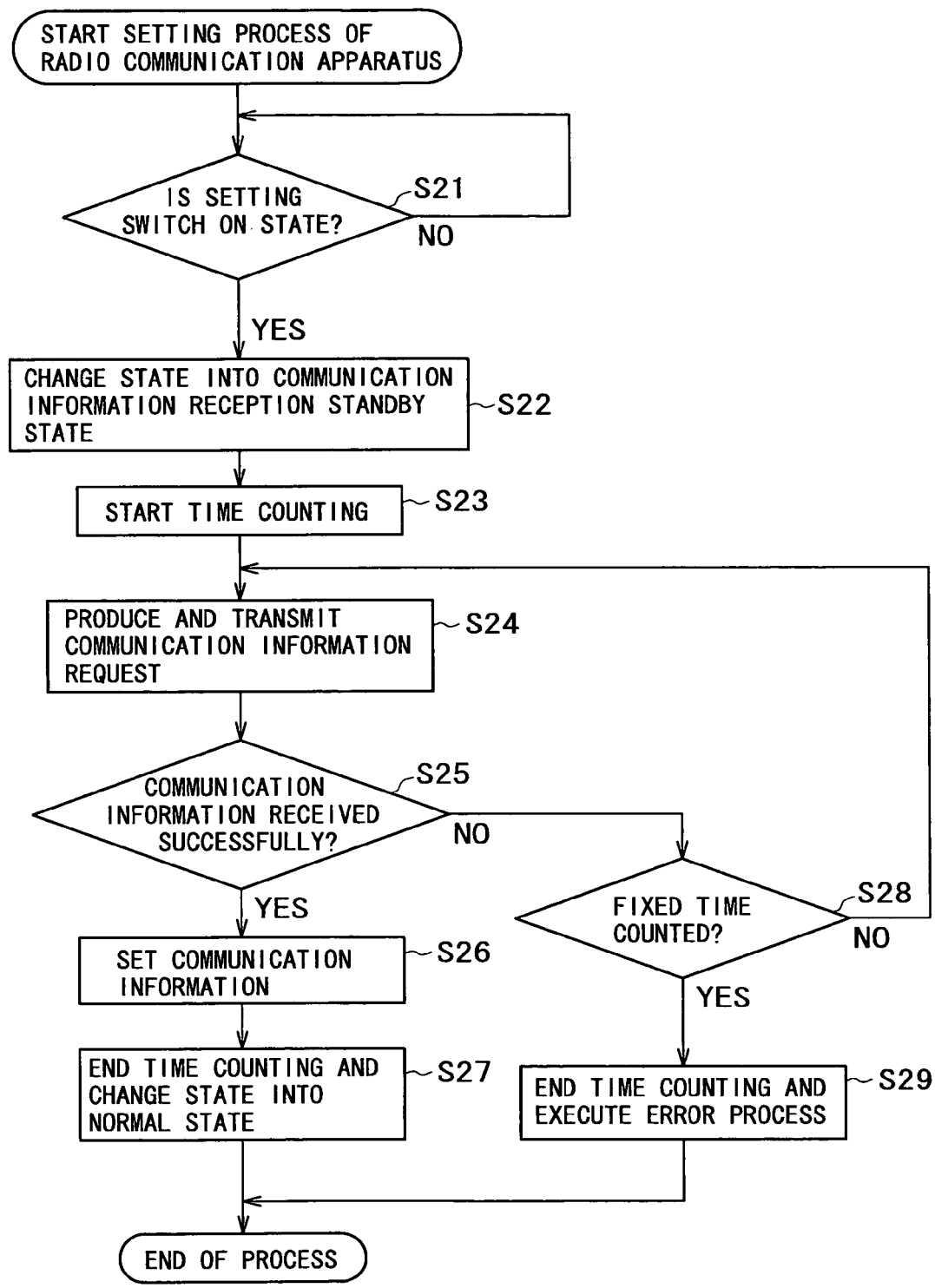
FIG. 11 is a flow chart illustrating an example of a setting process for radio communication of the radio communication apparatus connected to the information processing apparatus shown in FIG. 1.

Subsequently, the setting process for radio communication in the radio communication system of FIG. 1 to which the present invention is applied is described with reference to flow charts of FIGS. 10 and 11 and arrow charts of FIGS. 12 and 13. The flow chart of FIG. 10 illustrates an example of a setting process of the radio communication apparatus 11 of the access point 2 side while the flow chart of FIG. 11 illustrates an example of a setting process of the radio communication apparatus 3 connected to the information processing apparatus 4. FIGS. 12 and 13 illustrates relationships between the processes of the radio communication apparatus 11 and the radio communication apparatus 3. More particularly, FIG. 12 illustrates an example wherein a special probe request is utilized for transmission of a communication information request and a special probe response is utilized for transmission of communication information. In contrast, FIG. 13 illustrates another example wherein a management frame is utilized for transmission of a communication information request and communication information.

While the setting processes of the radio communication apparatus 11 and the radio communication apparatus 3 are described individually in order with reference to FIGS. 10 and 11, the relationship between the processes of the radio communication apparatus 11 and the information repeating apparatus 12 can be recognized readily by referring to corresponding steps of FIGS. 12 and 13.

It is assumed here that the radio communication apparatus 11 of the access point 2 side has produced communication information (in the present case, an SSID and a WEP key) and has the communication information set in the radio communication apparatus 11 itself already, and the initial states, that is, the states at present, of the radio communication apparatus 11 and the radio communication apparatus 3 are the normal states.

First, the setting process for ratio communication of the radio communication apparatus 11 of the access point 2 side is described with reference to FIGS. 10, 12 and 13.

First at step S1, the communication information transmission standby state establishing module 121 of FIG. 9 discriminates whether or not the setting switch 31 is in an on state.

If it is discriminated at step S1 that the setting switch 31 is not in an on state, then the processing returns to step S1 to discriminate again whether or not the setting switch 31 is in an on state.

In other words, the communication information transmission standby state establishing module 121 constantly supervises the state of the setting switch 31, that is, whether the setting switch 31 is in an on state or in an off state.

If the setting switch 31 is depressed, then the communication information transmission standby state establishing module 121 discriminates at step S1 that the setting switch 31 is in on state. Thus, at step S2, the communication information transmission standby state establishing module 121 changes the state of the radio communication apparatus 11 from the normal state to the communication information transmission standby state.

It is to be noted that, at this point of time, the communication information transmission standby state establishing module 121 may cause the display section 58 (FIG. 4) to display such information from which it can be discriminated explicitly that the radio communication apparatus 11 is in the communication information transmission standby state.

Then at step S3, the communication information transmission standby state establishing module 121 starts counting of time. The method of the time counting is not limited particularly, and the communication information reception standby state establishing module 131 may count time, for example, based on a clock from the oscillation section 60 (FIG. 4) or may cause a timer not shown to start a counting operation and acquire the count value of the timer to perform time counting.

At step S4, the communication information transmission module 124 discriminates whether or not a communication information request is received.

As far as a notification of reception of a communication information request is received from the communication information request reception module 123, the communication information transmission module 124 discriminates that no communication information request is received. Thus, the communication information transmission module 124 discriminates at step S7 whether or not a predetermined period of time is counted.

If the communication information transmission module 124 discriminates at step S4 that no communication information request is received, then it detects the period of time counted by the communication information transmission standby state establishing module 121, that is, the period of time after the point of time at which the time counting is started by the process at step S3 till the point of time. Then, the communication information transmission module 124 discriminates whether or not the detected period of time exceeds a predetermined threshold value to discriminate whether or not the predetermined period of time is counted.

If it is discriminated at step S7 that the predetermined period of time is counted (when time-out occurs), the communication information transmission standby state establishing module 121 ends the time counting and executes a predetermined error process at step S8 and then ends the setting process for radio communication.

In short, if a communication information request is not received within a fixed period of time after the setting switch 31 is depressed, then the radio communication apparatus 11 determines that the setting for radio communication has been canceled or some trouble has occurred, and executes an error process.

It is to be noted that, at this time, the communication information transmission standby state establishing module 121 may return the state of the radio communication apparatus 11 to the normal state or may newly set a different state that differs from the normal state or the communication information transmission standby state and change the state of the radio communication apparatus 11 to the newly set state.

Further, the error process at step S8 is not essentially required but may be executed or not executed. In other words, the object of the process at step S8 is to change the state of the radio communication apparatus 11 from the communication information transmission standby state to any other state such as the normal state.

On the other hand, if it is discriminated at step S7 that the fixed period of time is not counted as yet, then the processing returns to step S4, at which it is discriminated whether or not a communication information request is received. In other words, the communication information transmission module 124 constantly supervises that a communication information request is received after the state of the radio communication apparatus 11 is changed to the communication information transmission standby state.

In a normal case, if the setting switch 31 is placed into an on state (depressed), then also the setting switch 41 of the radio communication apparatus 3 side is depressed within a fixed period of time as hereinafter described.

Consequently, also the radio communication apparatus 3 changes its state to the communication information reception standby state, produces a communication information request and transmits the produced communication information request to the radio communication apparatus 11 through the radio circuit 23 (FIG. 1) (steps S21 to S24 of FIGS. 11 and 12 or FIG. 13).

It is to be noted that, in FIG. 12, the communication information request is a special probe request. On the other hand, in FIG. 13, the communication information request is management frame (broadcast) information and additionally includes a public key therein.

The communication information request reception module 123 controls reception of the communication information request and issues, when it confirms that the communication information request is received normally, a notification of the reception to the communication information transmission module 124. It is to be noted that, if the communication information request includes a public key (in the case of FIG. 13), though not shown, the communication information request reception module 123 provides the public key to the encryption module 125.

After the communication information transmission module 124 receives the notification from the communication information request reception module 123 that the communication information request is received normally, it discriminates at step S4 that a communication information request is received. Then at step S5, the communication information transmission module 124 controls the radio communication apparatus 11 to transmit communication information produced in advance by the communication information production module 122 (in the present case, an SSID and a WEP key) to the radio communication apparatus 3 through the radio circuit 23 (refer to FIG. 1).

It is to be noted that, where it is necessary to encrypt the communication information, at this point of time, that is, at the point of time of step S5, the encryption module 125 encrypts the communication information to be transmitted and the communication information transmission module 124 controls transmission of the encrypted communication information. For example, where the communication information request includes a public key (in the case of FIG. 13), the encryption module 125 encrypts the communication information using the public key, and the communication information transmission module 124 performs control to transmit the encrypted communication information by using a management frame (Unicast).

On the other hand, where the communication information request is a special probe request (in the case of FIG. 12), the radio communication apparatus 11 transmits a special probe response, that is, a special probe response wherein an SSID and a WEP key are inserted in the SSID column of a normal probe response.

Then, if the communication information transmission module 124 confirms that the communication information has been transmitted normally, then it notifies the communication information transmission standby state establishing module 121 of the normal transmission.

The communication information transmission standby state establishing module 121 receives the notification and ends the time counting and then changes the state of the radio communication apparatus 11 into the normal state at step S6. The setting process of radio communication for the radio communication apparatus 11 of the access point 2 side is ended thereby.

Thereafter, a normal negotiation is performed, and the radio communication apparatus 11 on the access point 2 side and the radio communication apparatus 3 perform radio communication therebetween. It is to be noted that description of processes succeeding the setting process for radio communication, that is, processes of the radio communication apparatus 11 in the normal state, is omitted herein because the processes do not have a direct relationship with the present invention and can be recognized readily by those skilled in the art.

It is to be noted that, while, in the example of FIG. 10, the state of the radio communication apparatus 11 is changed to the normal state at a point of time when communication information is transmitted, the timing of the changing to the normal state is not limited to that of the example of FIG. 10, but may alternatively be a point of time at which, for example, new information such as acknowledge information is received from the radio communication apparatus 3.

Now, the setting process for radio communication of the radio communication apparatus 3 connected to the information processing apparatus 4 corresponding to the setting process for radio communication of the radio communication apparatus 11 of the access point 2 side described above is described with reference to FIGS. 11, 12 and 13.

At step S21, the communication information reception standby state establishing module 131 of FIG. 9 discriminates whether or not the setting switch 41 is in an on state.

If it is discriminated at step S21 that the setting switch 41 is not in an on state, then the processing returns to step S21 to discriminate again whether or not the setting switch 41 is in an on state.

In other words, the communication information reception standby state establishing module 131 constantly supervises the state of the setting switch 41, that is, whether the setting switch 41 is in an on state or in an off state.

If the setting switch 41 is depressed, then the communication information reception standby state establishing module 131 discriminates at step S21 that the setting switch 41 is in an on state. Then at step S22, the communication information reception standby state establishing module 131 changes the state of the radio communication apparatus 3 from the normal state to the communication information reception standby state.

It is to be noted that, at this point of time, the communication information reception standby state establishing module 131 may cause the display section 98 (FIG. 8) to display information from which it can be discriminated explicitly that the radio communication apparatus 3 is in the communication information reception standby state.

Then at step S23, the communication information reception standby state establishing module 131 starts counting of time. The method of the timing counting is not limited particularly, and the communication information reception standby state establishing module 131 may perform the time counting, for example, based on a clock from the oscillation section 100 (FIG. 8) or cause a timer not shown to start a time counting operation and acquire the count value of the timer to perform the time counting similarly to the radio communication apparatus 11 (communication information transmission standby state establishing module 121) of the access point 2 side.

Then, the communication information reception standby state establishing module 131 notifies the communication information request transmission module 132 that the state of the radio communication apparatus 3 has been changed to the communication information reception standby state.

Upon reception of the notification, the communication information request transmission module 132 produces a communication information request and controls the radio communication apparatus 3 to transmit the communication information request to the radio communication apparatus 11 by wire communication at step S24.

It is to be noted that the destination of the communication information request then may be the access point 2 (radio communication apparatus 11) or may alternatively be broadcast destinations.

At step S25, the communication information reception module 133 discriminates whether or not communication information is received successfully.

As far as communication information is not supplied to the communication information reception module 133, it discriminates at step S25 that communication information is not received successfully and then discriminates at step S28 whether or not a predetermined period of time is counted.

If the communication information reception module 133 discriminates at step S25 that communication information is not received successfully, then it detects, at step S28, the period of time counted by the communication information reception standby state establishing module 131, that is, the period of time after the point of time at which the counting is started by the process at step S23 till the point of time then thereby to discriminate whether or not a fixed period of time is counted.

If it is discriminated at step S28 that the fixed period of time is counted (that is, if time-out occurs), then the communication information reception standby state establishing module 131 ends the time counting and executes a predetermined error process at step S29 and then ends the setting process for radio communication.

In short, if communication information is not received within a fixed period of time after the setting switch 41 is depressed, then the radio communication apparatus 3 determines that the setting for radio communication is canceled or some trouble has occurred and thus executes the error process.

It is to be noted that, at this time, the communication information reception standby state establishing module 131 may return the state of the radio communication apparatus 3 to the normal state or otherwise may newly set a state different from the normal state or the communication information reception standby state and change the state of the radio communication apparatus 3 to the newly set state.

Further, the error process at step S29 is not essentially required, but the error process may be executed or may not be executed. In other words, the object of the process at step S29 is to change the state of the radio communication apparatus 11 from the communication information reception standby state to any other state such as the normal state.

On the other hand, if it is discriminated at step S28 that the fixed period of time is not counted as yet, then the processing returns to step S25, at which it is discriminated whether or not communication information is received successfully.

In a normal case, if the setting switch 41 is placed into an on state (depressed), then also the setting switch 31 of the radio communication apparatus 11 side is depressed within a fixed period of time and the state of the radio communication apparatus 11 is changed to the communication information transmission standby state by the process at step S2 as described hereinabove. Then, when the communication information request transmitted from the radio communication apparatus 3 is received by the radio communication apparatus 11 through the radio circuit 23 (refer to FIG. 1), that is, when it is discriminated by the process at step S4 that a communication information request is received, then communication information (in the present case, an SSID and a WEP key) is transmitted from the radio communication apparatus 11 by the process at step S5.

The communication information transmitted from the radio communication apparatus 11 is transmitted to the radio communication apparatus 3 through the radio circuit 23 (refer to FIG. 1). Therefore, the communication information reception module 133 controls reception of the communication information, and when it confirms that the communication information is received normally, it discriminates that the communication information is received successfully and supplies the communication information to the communication information setting module 134 at step S25.

It is to be noted that, where the communication information is in an encrypted form, at this point of time, the communication information reception module 133 supplies the encrypted communication information to the decryption module 135. Then, when decrypted communication information is received from the decryption module 135, the communication information reception module 133 supplies the decrypted communication information to the communication information setting module 134. For example, if the radio communication apparatus 3 places and transmits a common key into and together with the communication information request to the radio communication apparatus 11 (in the case of FIG. 13), since the communication information is in a form where it is encrypted with the common key, the common key is utilized to decrypt the communication information.

Consequently, the communication information setting module 134 sets, at step S26, the received communication information (in the present case, an SSID and a WEP key) in the radio communication apparatus 3 itself and notifies, when the setting is completed, the communication information reception standby state establishing module 131 of the completion of the setting.

Upon reception of the notification, the communication information reception standby state establishing module 131 ends the time counting and changes the state of the radio communication apparatus 3 to the normal state at step S27. The setting process for radio communication of the radio communication apparatus 3 is ended thereby.

After the setting process for radio communication comes to an end with the radio communication apparatus 3 and the radio communication apparatus 11 in such a manner as described above, a normal negotiation is performed by them so that the radio communication apparatus 11 of the access point 2 side and the radio communication apparatus 3 can thereafter communicate with each other. It is to be noted that description of processes succeeding the setting process for radio communication, that is, processes of the radio communication apparatus 3 in the normal state, is omitted herein because the processes do not have a direct relationship with the present invention and can be recognized readily by those skilled in the art.

Accordingly, the information processing apparatus 4 can communicate with another information processing apparatus (not shown) connected to the network 1 through the radio communication apparatus 3, access point 2 (radio communication apparatus 11 and information repeating apparatus 12) and network 1 as seen in FIG. 1.

In this manner, in the radio communication system of the present embodiment, if a predetermined signal based on an operation of the user is inputted to both of the access point 2 (radio communication apparatus 11) and the radio communication apparatus 3 as seen in FIG. 1, that is, if the setting switch 31 and the setting switch 41 of FIG. 1 are depressed individually, then the access point 2 (radio communication apparatus 11) transmits identification information of the radio network (in the present case, an SSID) and information regarding the security (in the present case, a WEP key) as communication information to the radio communication apparatus 3 through the radio circuit 23. The radio communication apparatus 3 receives and sets the communication to the radio communication apparatus 3 itself.

Accordingly, in the present embodiment, a personal computer is not required for setting for radio communication (the necessity to use a setting tool installed in a personal computer is eliminated), and information necessary for setting for radio communication is exchanged in response to a predetermined trigger while manual registration of an apparatus is not performed. Consequently, it is possible to set setting information (the communication information described above and this includes not only identification information such as, for example, an SSID but also information regarding the security such as a WEP key) in a station (for example the radio communication apparatus 3 of FIG. 1) by a simple operation of the user. In other words, the first to third subjects of the conventional apparatus described hereinabove can be solved.

Furthermore, in the present embodiment, each of the access point and the station performs independent time management and performs discrimination of an error in setting for radio communication based on the time management.

More particularly, if the access point 2 (radio communication apparatus 11) starts a setting process for radio communication earlier, then it enters and remains in the communication information transmission standby state for a fixed period of time. Then, if the access point 2 (radio communication apparatus 11) does not receive a communication information request from the station (radio communication apparatus 3) in the meantime, then time-out occurs and the access point 2 (radio communication apparatus 11) enters the normal state (or a predetermined state different from the communication information transmission standby state or the normal state). On the other hand, if the station (radio communication apparatus 3) starts a setting process for radio communication earlier, then it enters and remains in the communication information reception transmission state for a fixed period of time. Then, if the station (radio communication apparatus 3) does not receive communication information from the access point 2 (radio communication apparatus 11) in the meantime, time-out occurs and the station (radio communication apparatus 3) enters the normal state (or a predetermined state different from the communication information transmission standby state or the normal state).

Accordingly, the timings of the triggers for setting radio communication of the access point 2 (radio communication apparatus 11) and the station (radio communication apparatus 3), that is, in the present case, the timings at which the setting switch 31 and the setting switch 41 are depressed, do not matter. As a result, the user can provide a trigger to each of the access point 2 (radio communication apparatus 11) and the station (radio communication apparatus 3) in accordance with the taste of the user itself.

Further, in the present embodiment, since each of the access point 2 (radio communication apparatus 11) and the station (radio communication apparatus 3) performs independent time management, that is, since the setting for mutual radio communication is started at a timing before time-out occurs with one of them, it is difficult for any other access point than the access point 2, with whom the user wants to communicate, that is, for an access point managed by any other than the user or the like, to estimate a timing for starting of setting for radio communication. In other words, it is difficult for an access point other than the access point 2, with which the user wants to communicate, to perform setting for radio communication with the station (radio communication apparatus 3) possessed by the user, and consequently, the safety in radio communication can be anticipated. Accordingly, the third subject of the conventional apparatus described hereinabove can be solved.

Incidentally, the radio communication system to which the present invention is applied is not limited to the form shown in FIG. 1 but may have various forms.

For example, in FIG. 1, the apparatus which performs radio communication with the access point 2 (radio communication apparatus 11), that is, the station, is the radio communication apparatus 3 connected to the different information processing apparatus 4, or in other words, substantially the different information processing apparatus 4 performs communication. However, the station may be an independent apparatus.

In this instance, naturally the radio communication apparatus 3 may perform radio communication with the access point 2 (radio communication apparatus 11) independently, that is, without being connected to another apparatus. However, for example, such a personal computer as shown in FIG. 14 may be utilized as an apparatus which performs radio communication with the access point 2 (radio communication apparatus 11).

Referring to FIG. 14, a central processing unit (CPU) 201 executes various processes in accordance with a program stored in a read only memory (ROM) 202 or a program loaded from a storage section 208 into a random access memory (RAM) 203.

In particular, for example, a program composed of the modules described hereinabove with reference to FIG. 9 from the communication information reception standby state establishing module 131 to the decryption module 135 is stored in the ROM 202, the storage section 208 or the like, and the CPU 201 suitably reads out and executes the modules.

Also data and so forth necessary for the CPU 201 to execute various processes are suitably stored into the RAM 203.

The CPU 201, ROM 202 and RAM 203 are connected to each other by a bus 204. Also an input/output interface 205 is connected to the bus 204.

An input section 206 including a keyboard, a mouse and so forth, an output section 207 including a display unit and so forth, a storage section 208 formed from a hard disk and so forth, a wire communication section 209 and a radio communication section 210 are connected to the input/output interface 205.

Thus, the radio communication section 210 controls radio communication, for example, with the radio communication apparatus 11 of the access point 2.

A trigger signal for starting a setting process for radio communication may be inputted from a switch in the form of hardware such as the setting switch 31 or the setting switch 41 described hereinabove (in the present case, such a switch as just described is provided as a component of the input section 206). However, the trigger signal may otherwise be inputted from a software switch.

As occasion demands, a drive 211 is connected to the input/output interface 205, and a removable recording medium 212 which may be a magnetic disk, an optical disk, a magneto-optical disk or a semiconductor memory is suitably loaded into the drive 211 and a computer program such as, for example, a program as illustrated in FIG. 9 read out from the removable recording medium 212 is installed into the storage section 208.

Also the radio communication apparatus 11 of the access point 2 side is not limited to the apparatus described hereinabove with reference to FIGS. 2 to 4, but, for example, the personal computer of FIG. 14 may be utilized.

In this instance, for example, a program composed of the modules described hereinabove with reference to FIG. 9 from the communication information transmission standby state establishing module 121 to the encryption module 125 is stored in the ROM 202, the storage section 208 or the like, and the CPU 201 suitably reads out and executes the modules.

Further, the radio communication section 210 controls radio communication, for example, with the radio communication apparatus 3 or some other personal computer or the like.

Further, where such a personal computer as described above does not include, for example, the radio communication section 210, if it includes, for example, a PC card connection section 221 connected to the input/output interface 205 as shown in FIG. 15, then it can perform radio communication readily by connecting or attaching a radio LAN PC card 222 to the PC card connection section 221.

In other words, it is possible to recognize that, in FIG. 1, the information processing apparatus 4 is the personal computer having the construction of FIG. 15 and the radio communication apparatus 3 connected to the information processing apparatus 4 is the radio LAN PC card 222.

Further, it is not essentially required for the radio communication apparatus 11 to function as an access point of the external network 1, but in the present embodiment, it is only necessary that the radio communication apparatus 11 and the radio communication apparatus 3 can perform mutual radio communication therebetween. In particular, while, in the example described hereinabove, the radio communication apparatus 11 is used in a form wherein it is connected to an external network through an access point, that is, in a form of the infrastructure mode, it is also possible to alternatively apply an Ad-Hoc mode wherein radio communication apparatus perform radio communication therebetween. In this instance, one of the radio communication apparatus 11, radio communication apparatus 3 and the personal computer having the construction of FIG. 14 or 15 serves as a master apparatus while the other apparatus serve as slave apparatus. Accordingly, each of the master and slave apparatus can execute the series of processes described hereinabove to perform setting the radio communication.

It is to be noted that the master apparatus here is an apparatus which merely outputs a beacon first, and if the output of the beacon from the master apparatus is interrupted by some reason, then the slave apparatus begins to output a beacon after a period of a random number and now serves as a new master apparatus. Further, if the master apparatus detects a beam outputted from any other apparatus, it discriminates based on the time stamp of the beacon whether the master apparatus or the other apparatus outputting the detected beacon should take precedence, and depending upon the discrimination, the master apparatus may be replaced by the other apparatus.

Furthermore, the communication method of the radio communication system to which the present invention is applied is not limited to a radio LAN, and any other radio communication system such as, for example, the Bluetooth or some wire communication system may be used as the communication method for the radio communication system.

Incidentally, in order for the modules described hereinabove with reference to FIG. 9 to execute predetermined functions, a program which constructs the software for the functions is installed from a network or a recording medium.

The recording medium may be formed as a package medium (removable recording medium 212) such as, for example, as shown in FIG. 14 or 15, a magnetic disk (including a floppy disk), an optical disk (including a CD-ROM (Compact Disk-Read Only Memory) and a DVD (Digital Versatile Disk)), a magneto-optical disk (including an MD (Mini-Disk)), or a semiconductor memory which has the program recorded thereon or therein and is distributed in order to provide the program to a user separately from the body of an apparatus, or as a ROM 202 or a hard disk included in the storage section 208 which has the program stored therein or thereon and is provided to a user in a form wherein it is incorporated in the body of an apparatus. Or, the recording medium may be formed as the storage section 59 of FIG. 4 or the storage section 99 of FIG. 8.

Further, the modules shown in FIG. 9 may have any form only if they achieve their respective functions.

In particular, the modules may be formed, for example, from hardware elements. In this instance, a manufacturer or the like can implement a block for performing setting for radio communication of a radio communication apparatus on the access point side having a setting different that of FIG. 4, 14 or 15 readily, for example, by fabricating hardware elements corresponding to the components of FIG. 9 from the communication information transmission standby state establishing module 121 to the encryption module 125 and connecting them as seen in FIG. 9. Further, the manufacturer or the like can implement a block for performing setting for radio communication of a radio communication apparatus on the station side having a setting different from that of FIGS. 8, 14 or 15 readily, for example, by fabricating hardware elements corresponding to the components of FIG. 9 from the communication information reception standby state establishing module 131 to the decryption module 135 and connecting them as seen in FIG. 9.

Also the construction of, for example, the program is not limited to that of the example of FIG. 9, but may have a module construction which includes modules each of which includes a combination of some or all of the functions of some of the modules shown in FIG. 9 or includes modules obtained by dividing the modules shown in FIG. 9. Alternatively, the program may merely have a single algorithm.

It is to be noted that, in the present specification, the steps which describe the program recorded in or on a recording medium may be but need not necessarily be processed in a time series in the order as described, and include processes which are executed parallelly or individually without being processed in a time series.

Further, in the present specification, the term "system" is used to represent an entire apparatus composed of a plurality of apparatus or processing sections.

While a preferred embodiment of the present invention has been described using specific terms, such description is for illustrative purposes only, and it is to be understood that changes and variations may be made without departing from the spirit or scope of the following claims.

What is claimed is:

1. A radio communication apparatus which communicates with a different radio communication apparatus by radio communication through a radio network, comprising:

switching means for selecting a first mode or a second mode;

setting means in which first information for identification of said radio network and second information regarding the security are set as communication information necessary for communication through said radio network; and transmission control means for controlling, when request information for requesting for transmission of the communication information is received from said different radio communication apparatus by radio communication, transmission of the first and second information to said different radio communication apparatus as a response to the request information by radio communication in the first mode, and transmitting the first and second information from said radio communication apparatus to the different radio communication apparatus without receiving request information in the second mode.

2. The radio communication apparatus according to claim 1, wherein the request information is a probe request.

3. The radio communication apparatus according to claim 1, wherein a management frame is utilized for the transmission of the request information and the communication information.

4. The radio communication apparatus according to claim 1, wherein the first information is a Service Set Identification.

5. The radio communication apparatus according to claim 1, wherein the second information is a Wired Equivalent Privacy key.

6. The radio communication apparatus according to claim 1, further comprising encryption means for encrypting the communication information at least once, said transmission control means controlling the transmission of the communication information encrypted by said encryption means.

7. A radio communication method for a radio communication apparatus which communicates with a different radio communication apparatus by radio communication through a radio network, comprising:
selecting a first mode or a second mode;
controlling, when request information for requesting for transmission of communication information necessary for communication through said radio network is transmitted from said different radio communication apparatus to said radio communication apparatus by radio communication, transmission of first information for identification of said radio network and second information regarding the security set as communication information in said radio communication apparatus in advance by radio communication from said radio communication apparatus to said different radio communication apparatus as a response to the request information in the first mode, and transmitting the first and second information from said radio communication apparatus to the different radio communication apparatus without receiving request information in the second mode.

8. A computer readable storage medium including computer executable instructions, wherein the instructions, when executed by a processor, which controls a radio communication apparatus which communicates with a different radio communication apparatus by radio communication through a radio network, cause the processor to execute a method comprising:
selecting a first mode or a second mode;
controlling, when request information for requesting for transmission of communication information necessary for communication through said radio network is transmitted from said different radio communication apparatus to said radio communication apparatus by radio communication, transmission of first information for identification of said radio network and second information regarding the security set as communication information in said radio communication apparatus in advance by radio communication from said radio communication apparatus to said different radio communication apparatus as a response to the request information in the first mode, and transmitting the first and second information from said radio communication apparatus to the different radio communication apparatus without receiving request information in the second mode.

* * * * *